INVENTORS.
James A. Murphy
Charles A. Lee and
Eduards Spravnicks
BY
ATTORNEYS.

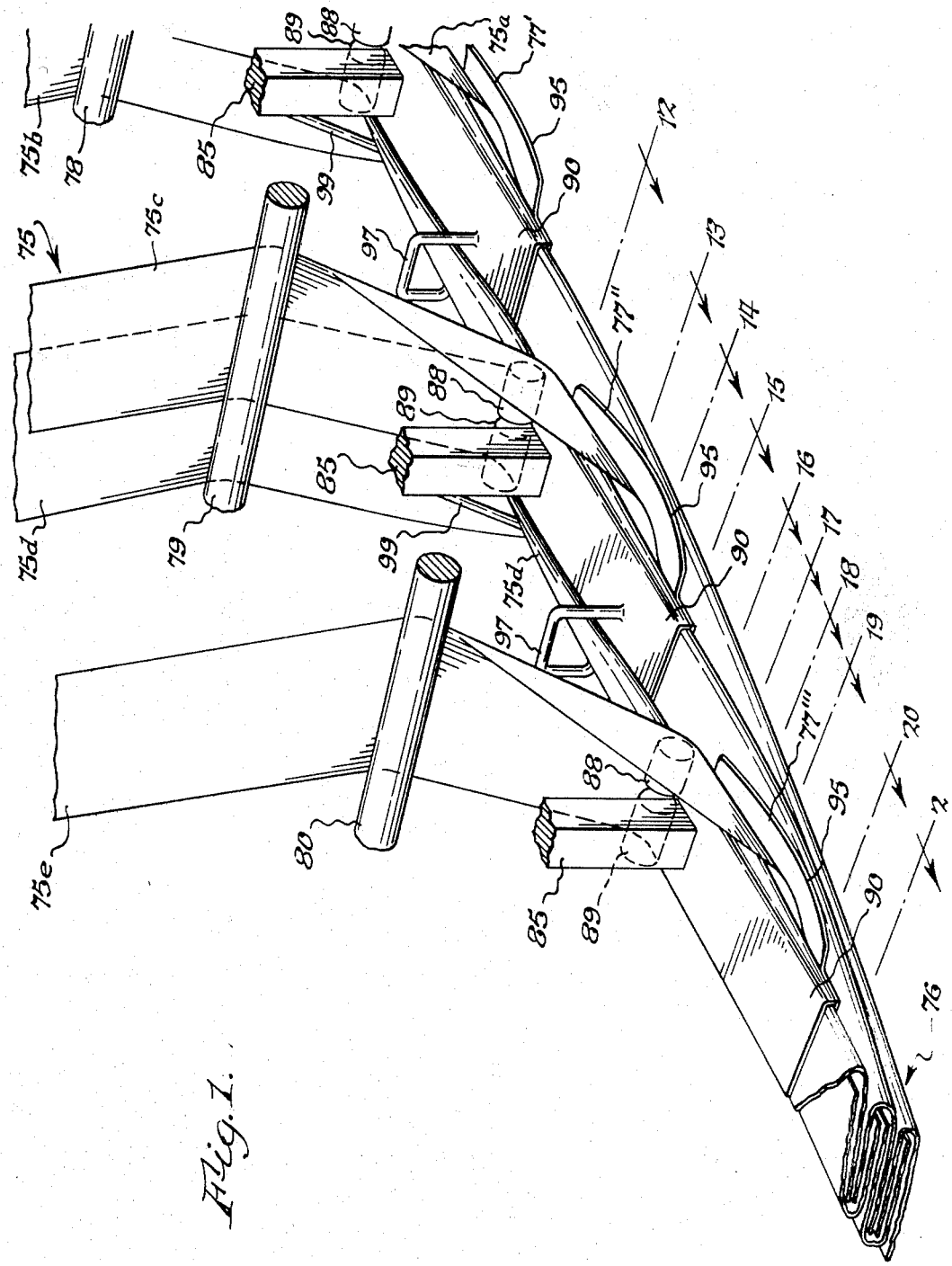

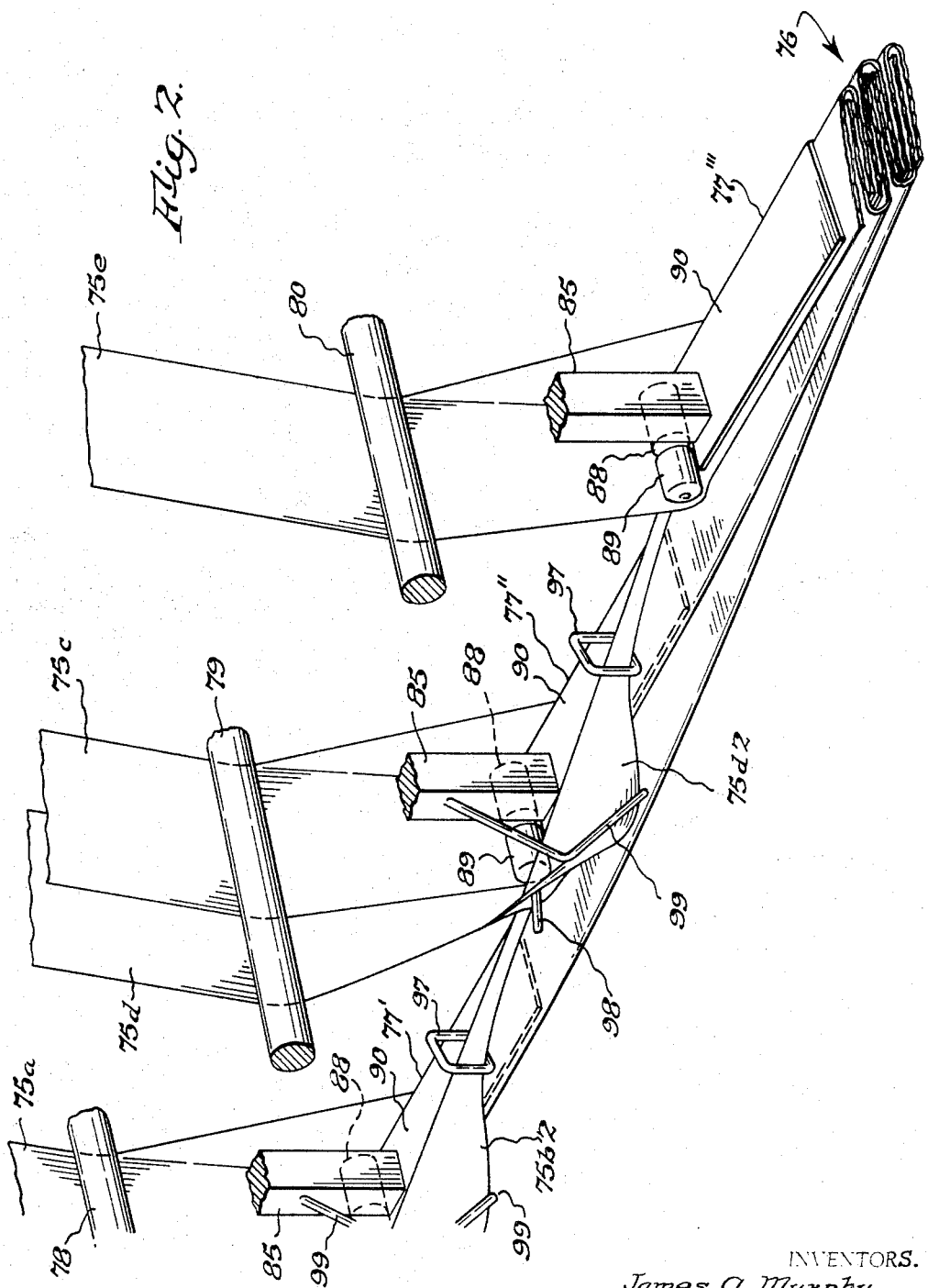

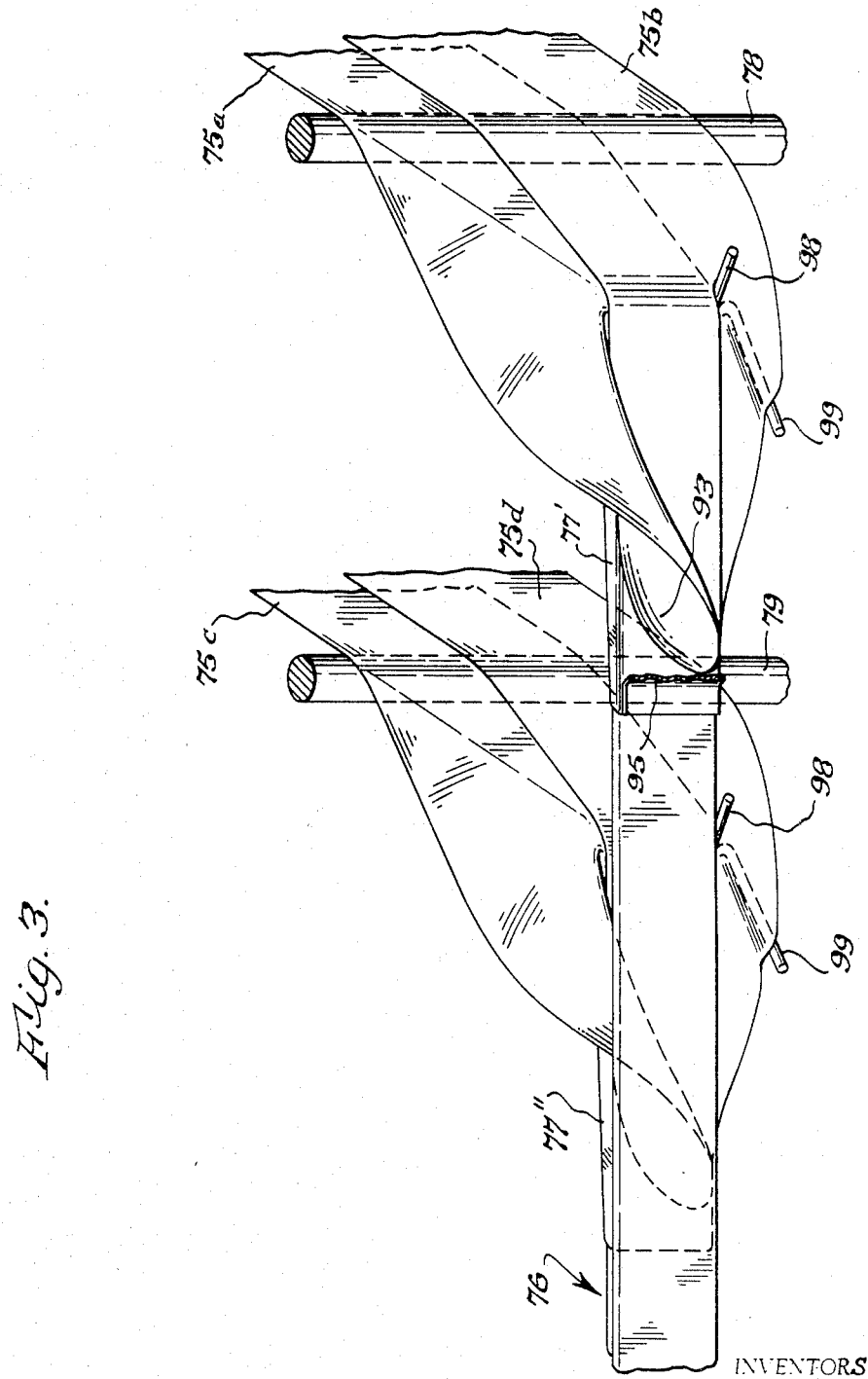

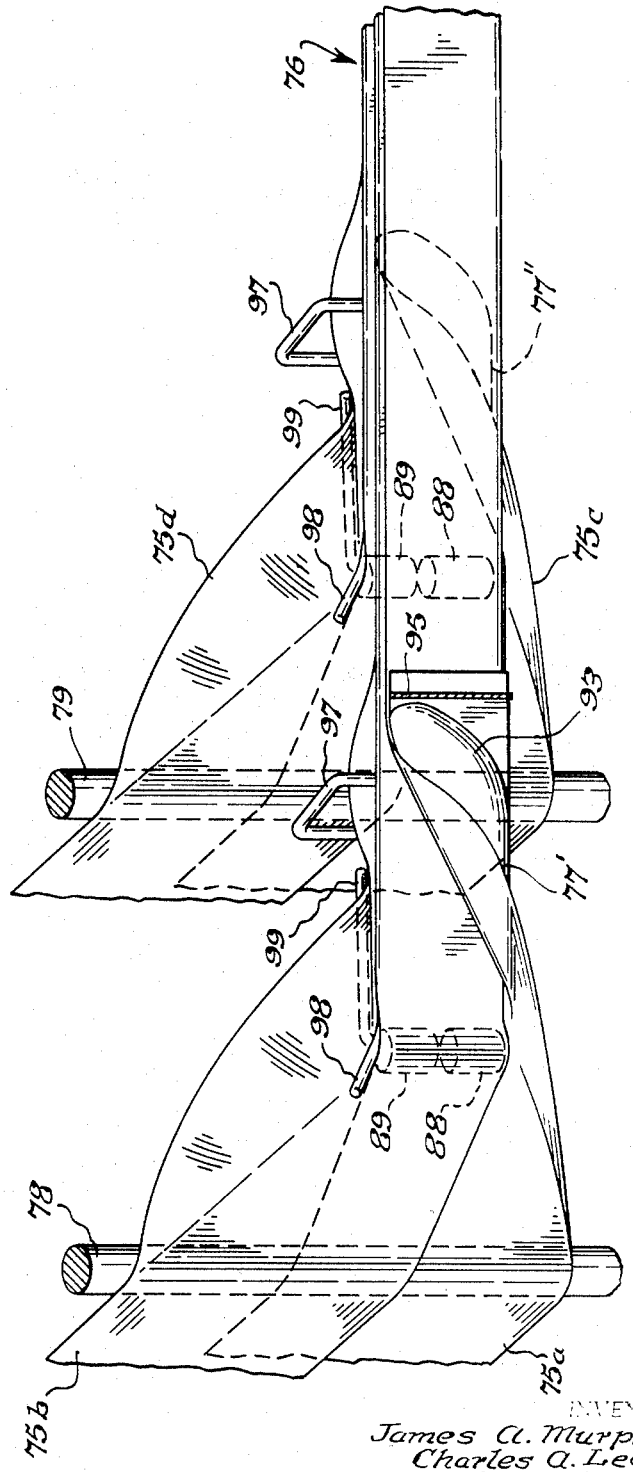

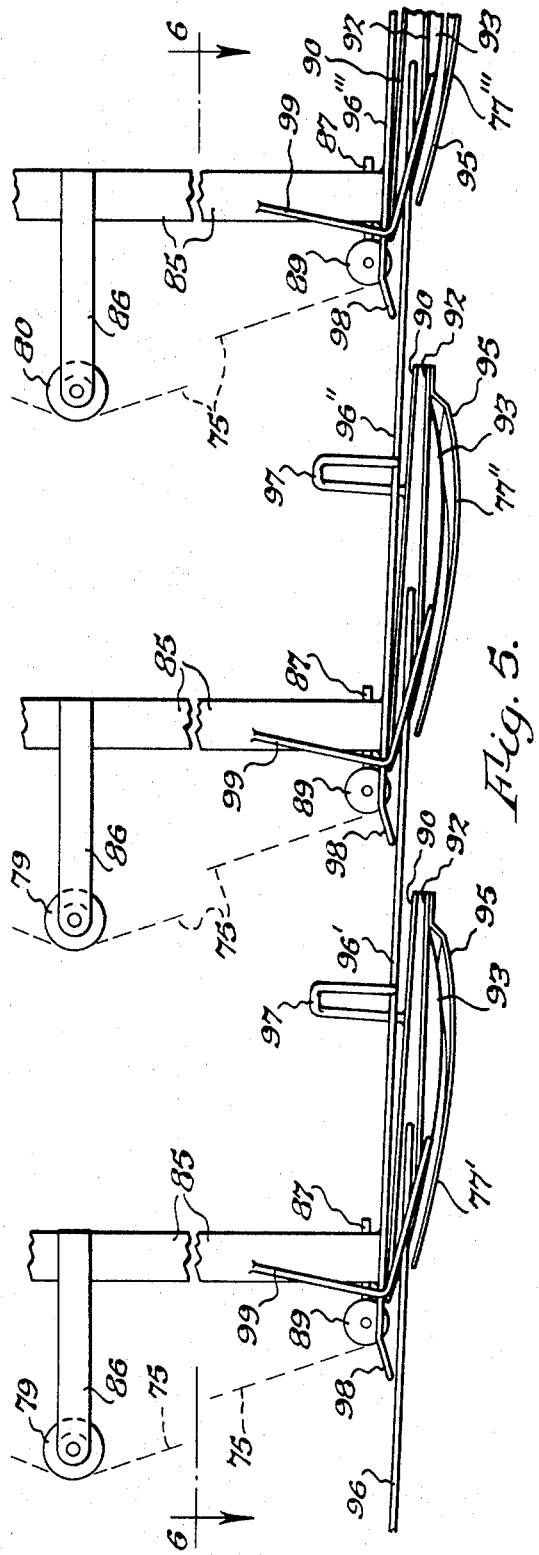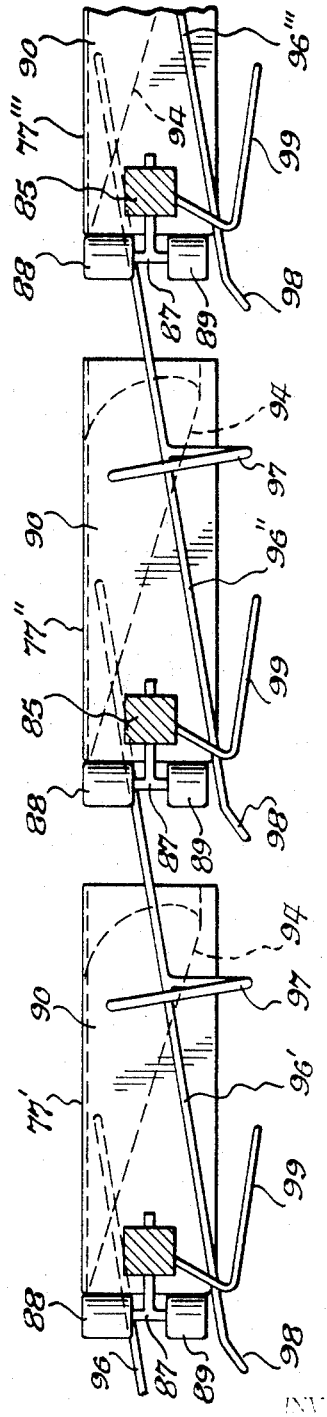

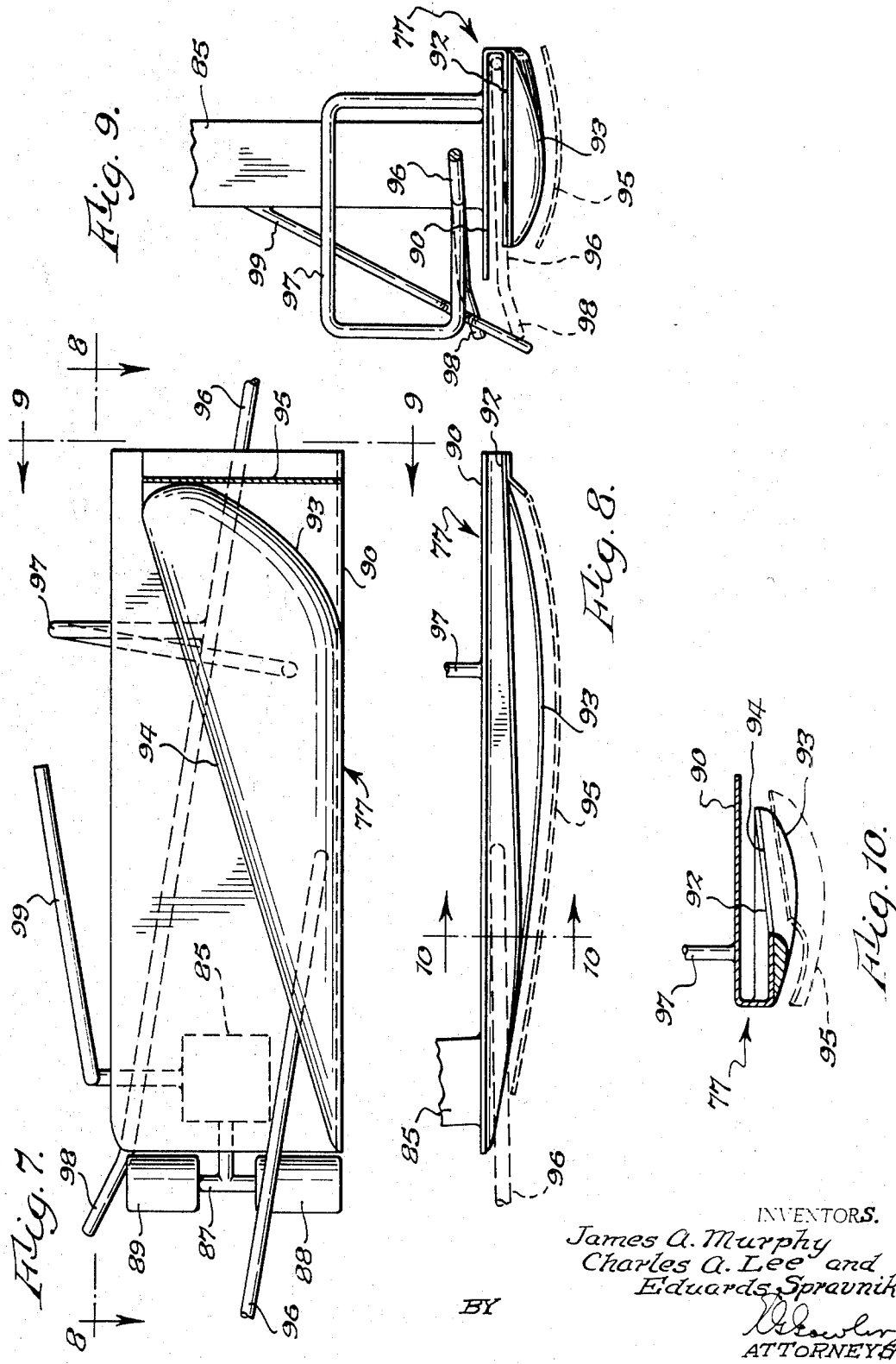

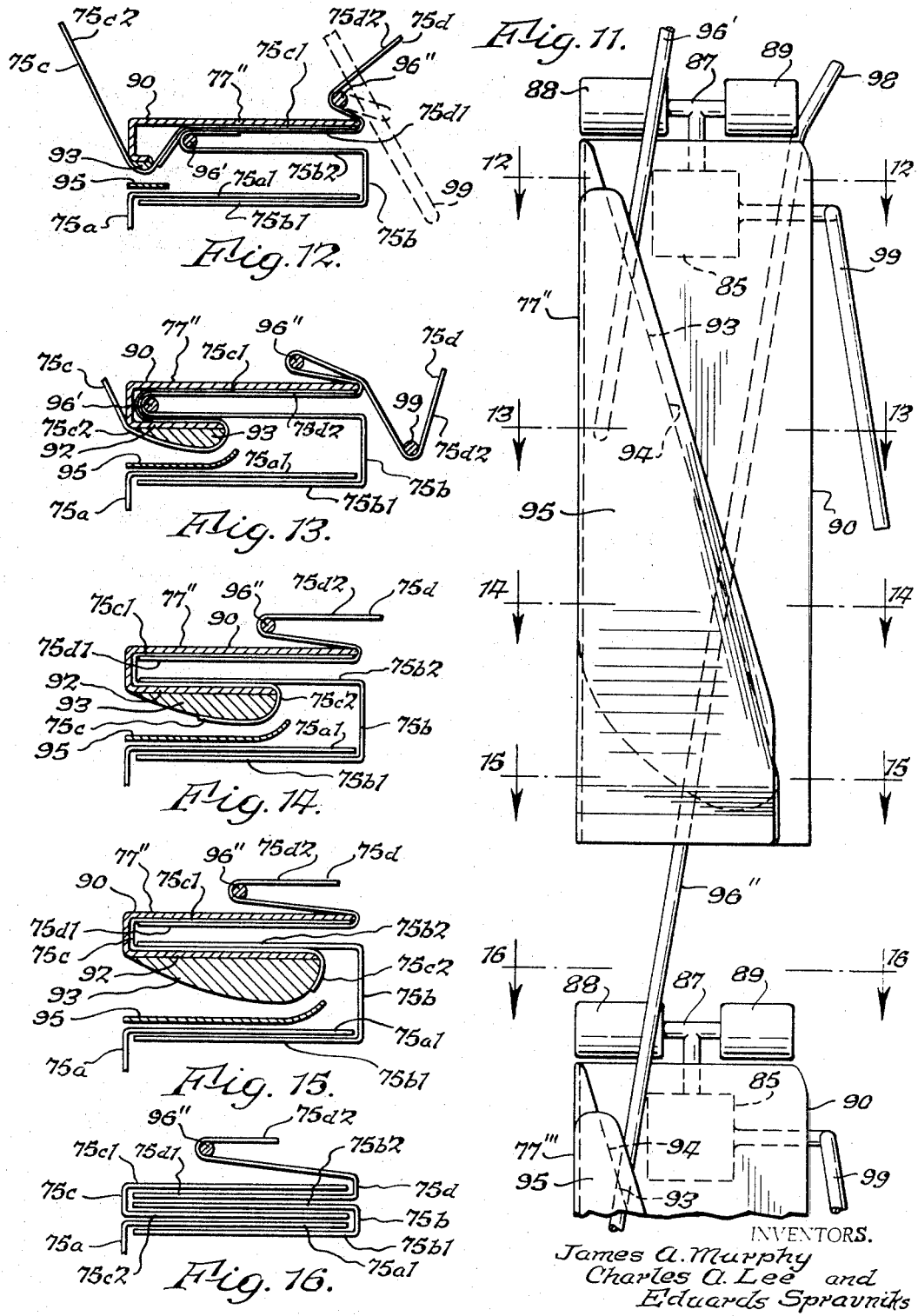

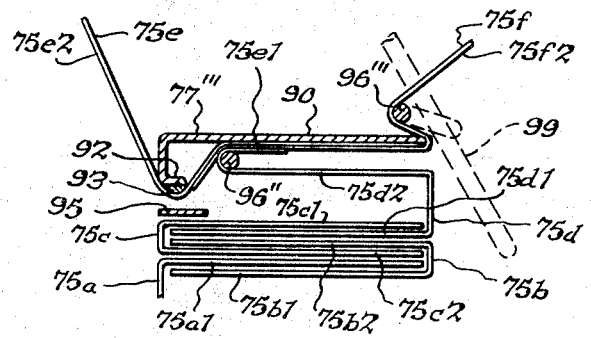
Fig. 17.
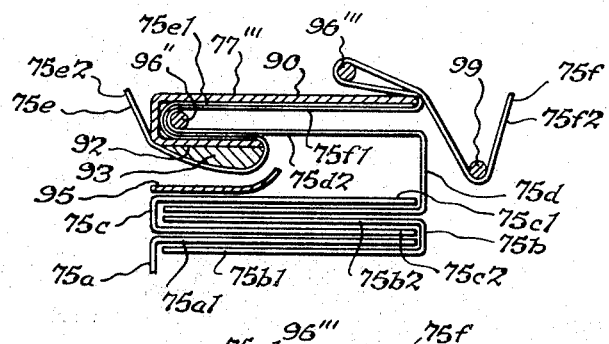
Fig. 18.
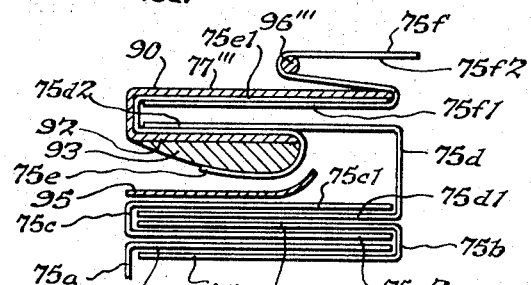
Fig. 19.
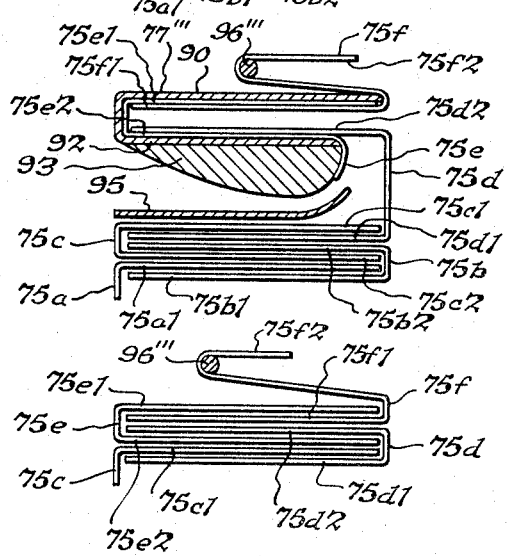
Fig. 20.
Fig. 21.

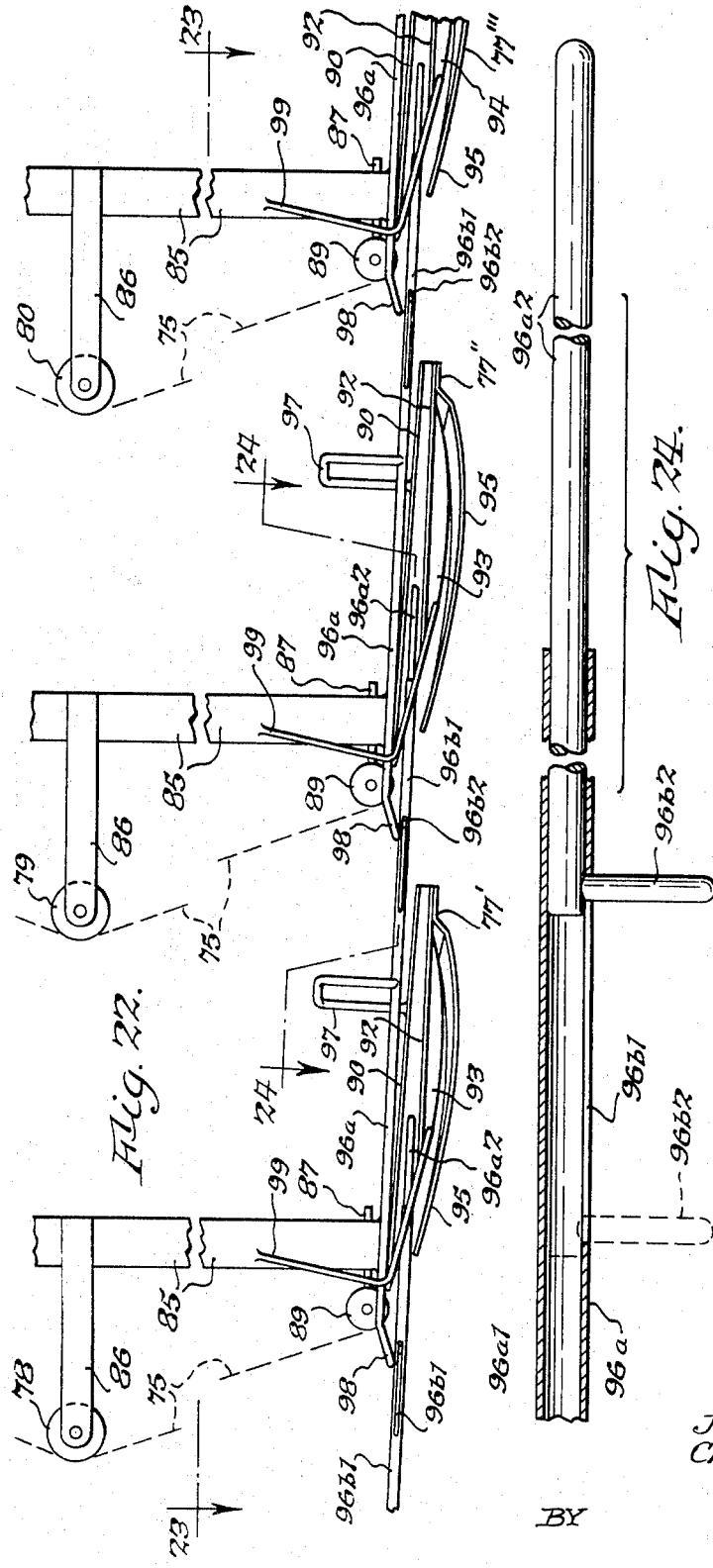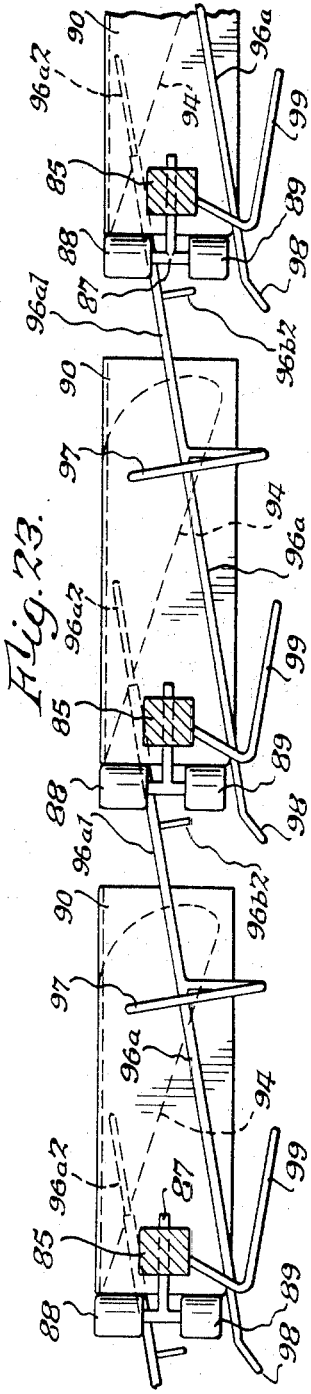

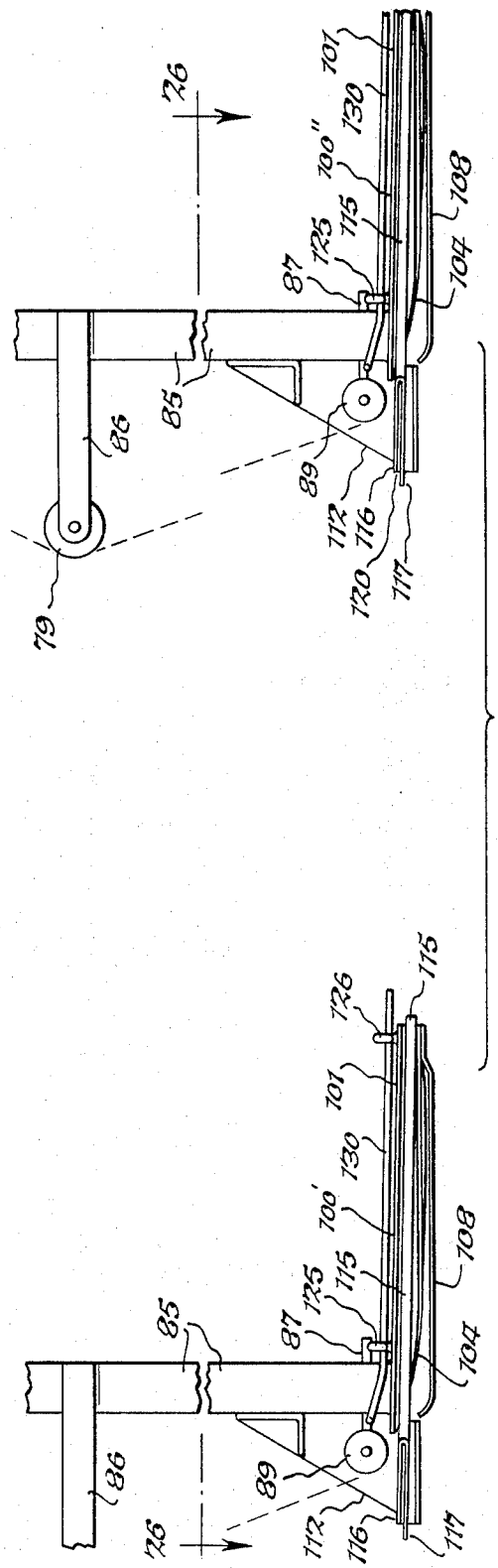
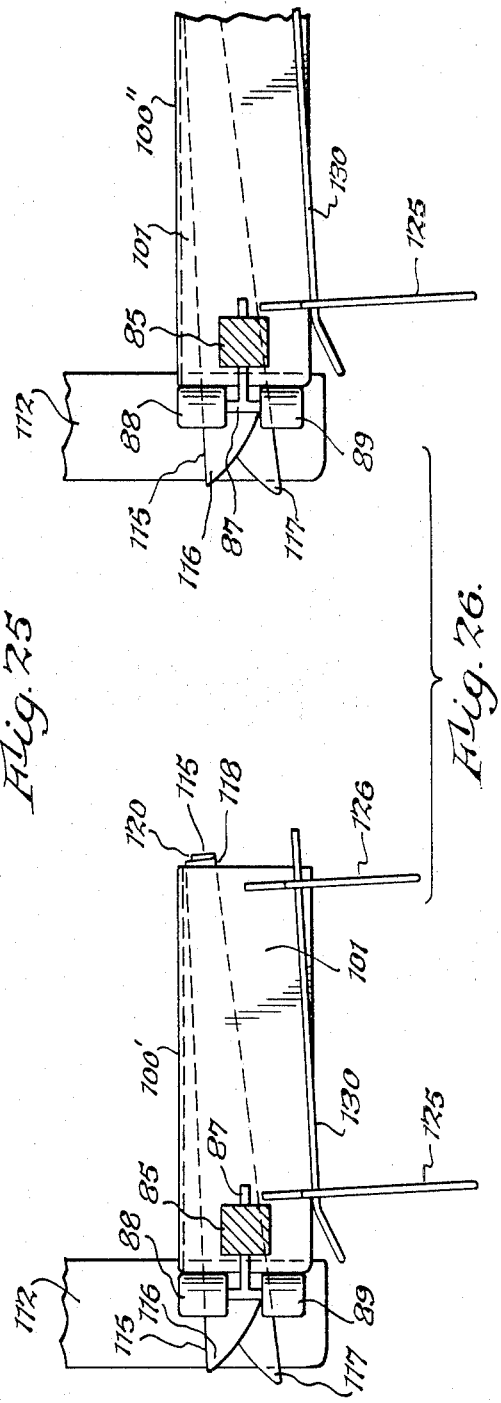

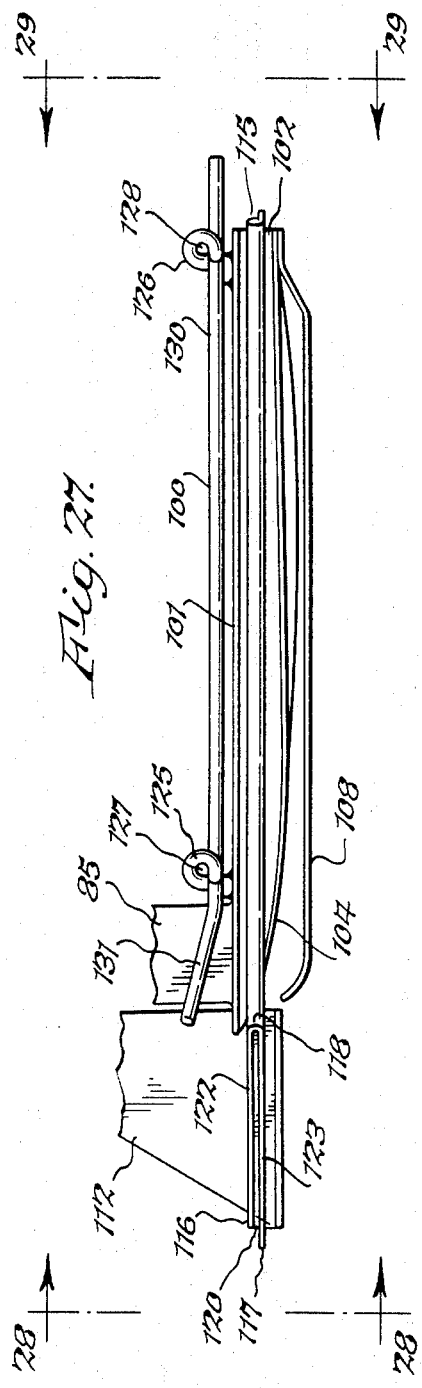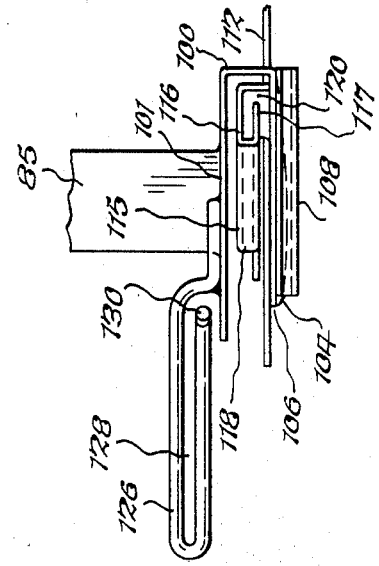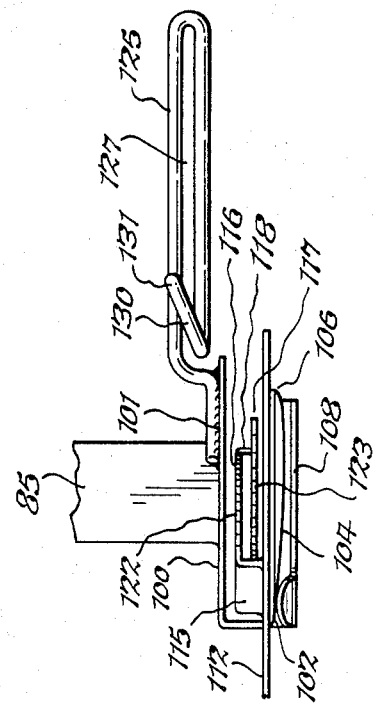

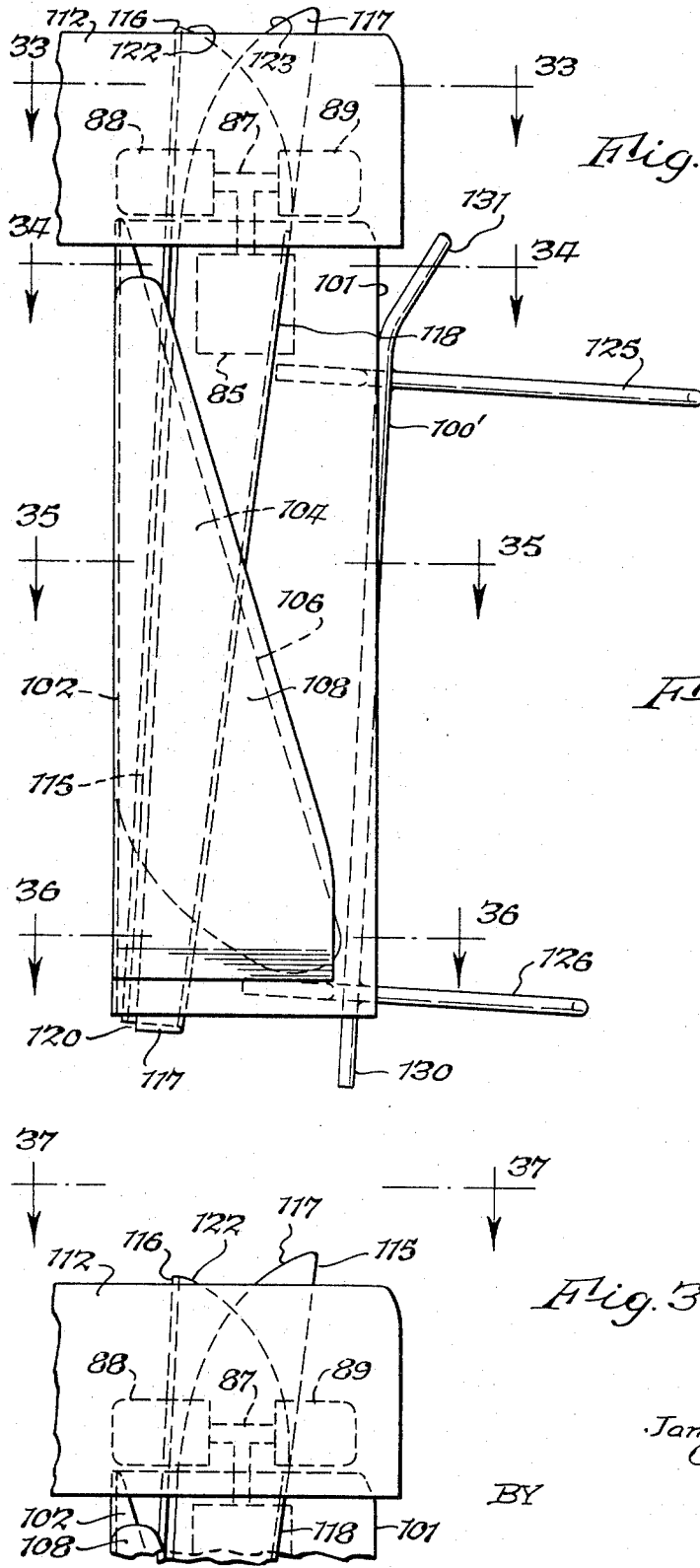

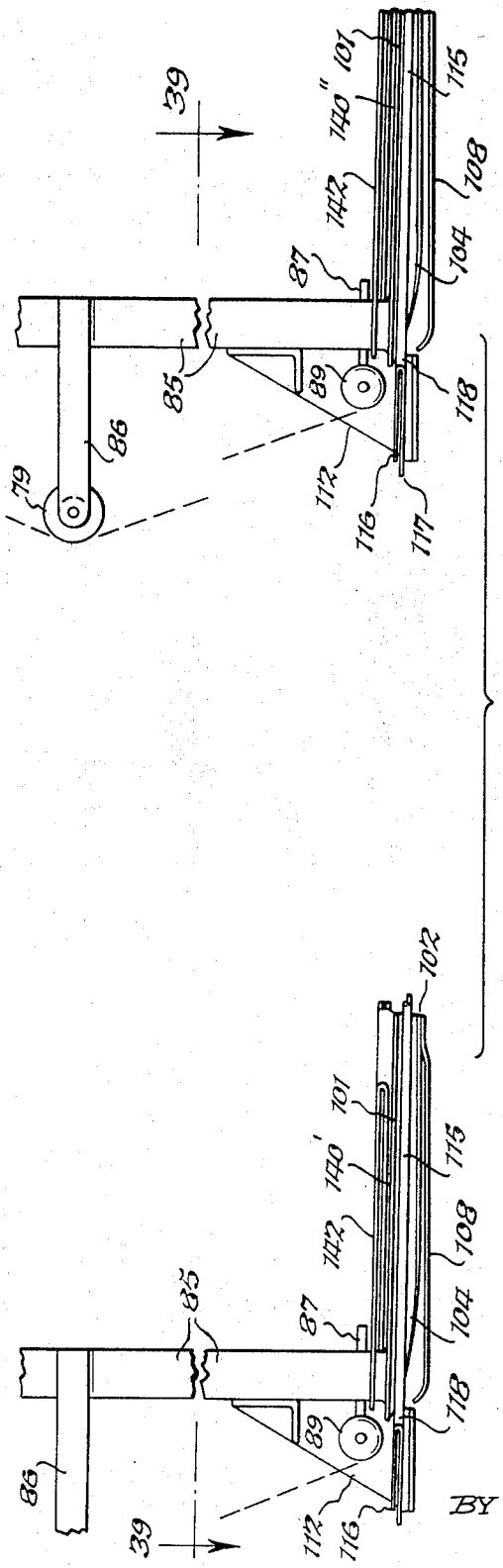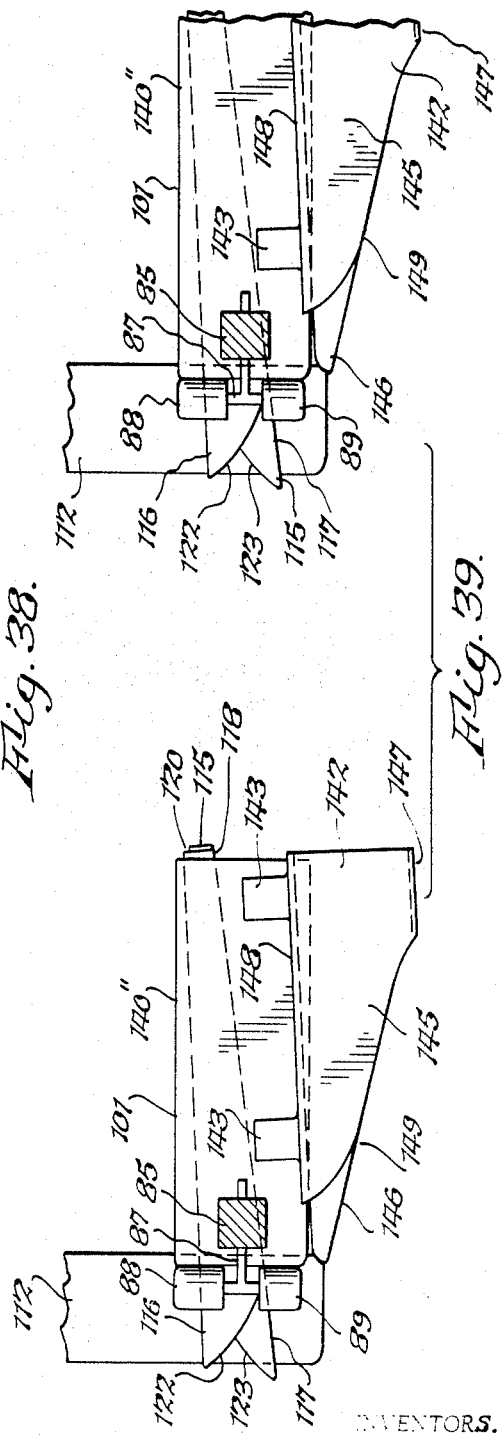
Fig. 38.
Fig. 39.
INVENTORS.
James A. Murphy
Charles A. Lee and
Eduards Spravniks
ATTORNEYS.

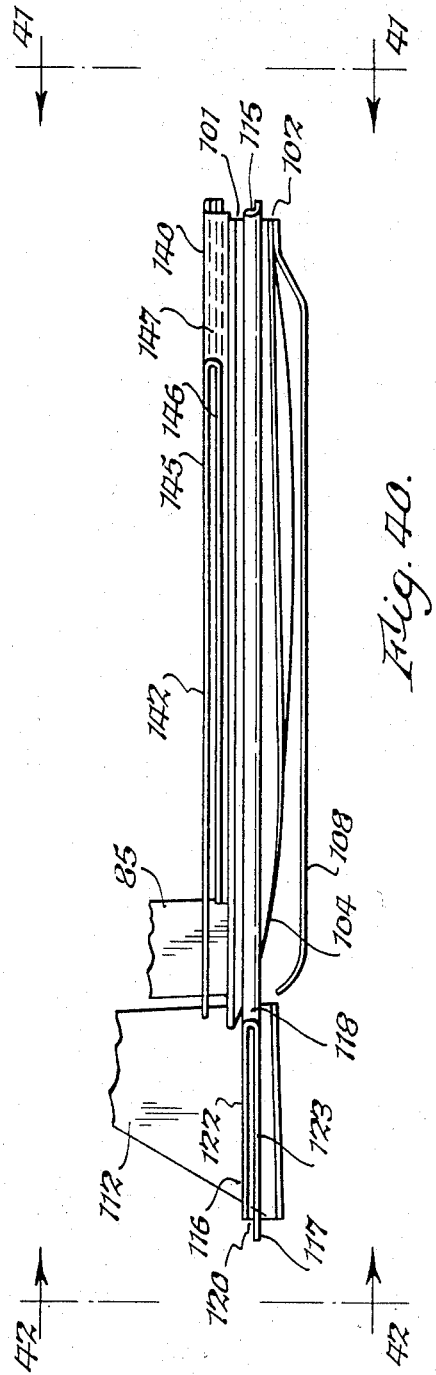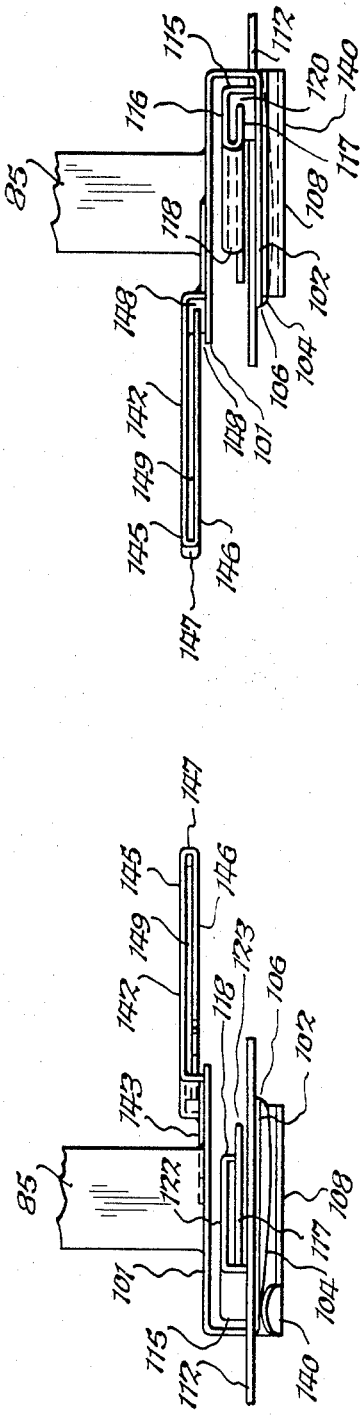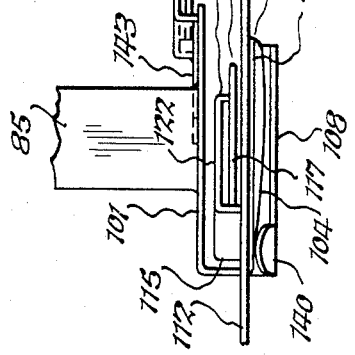

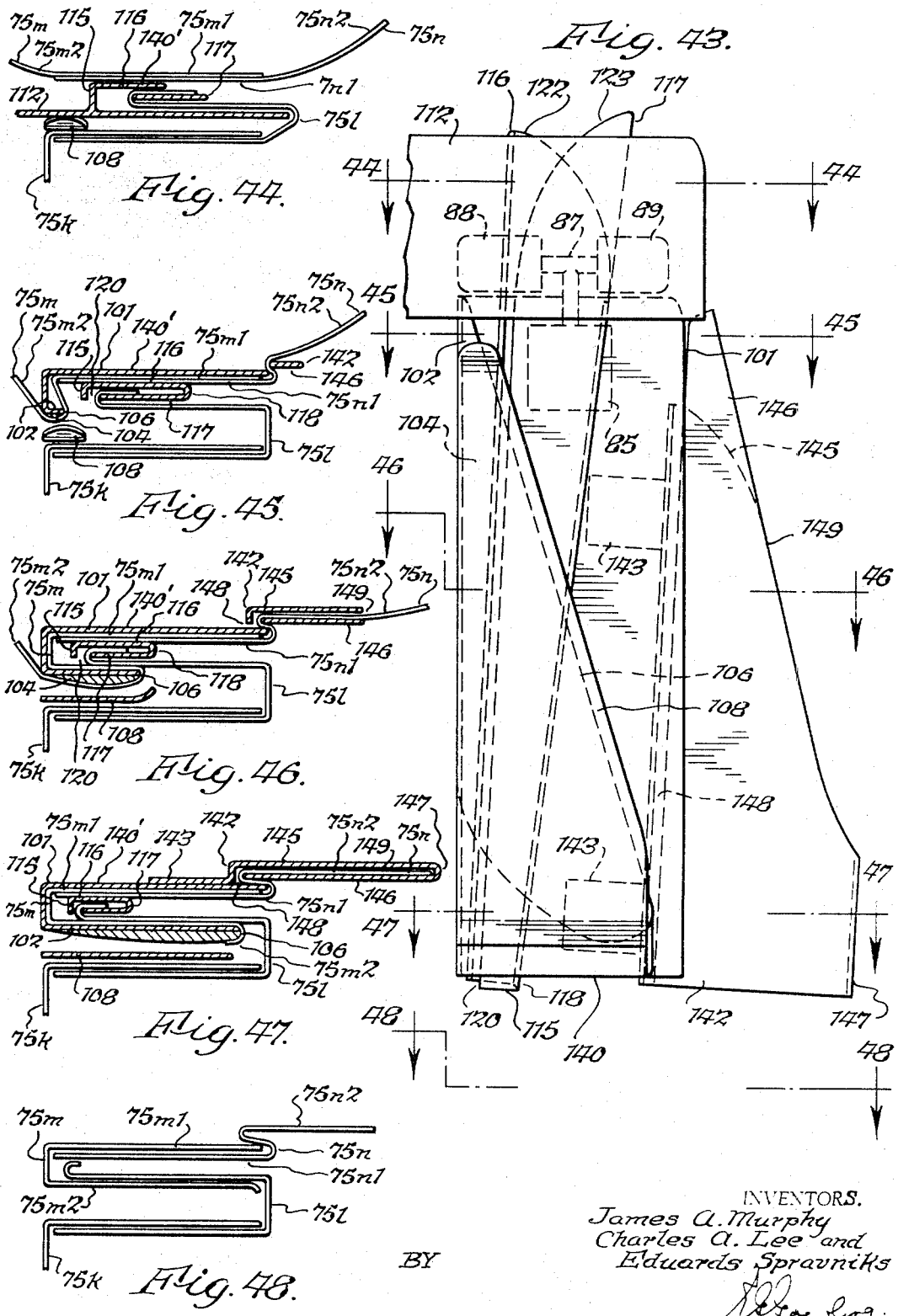

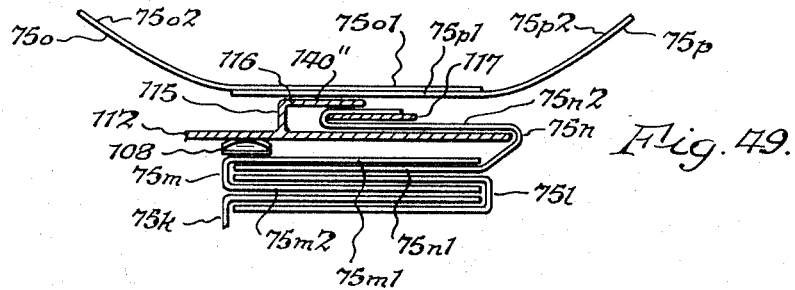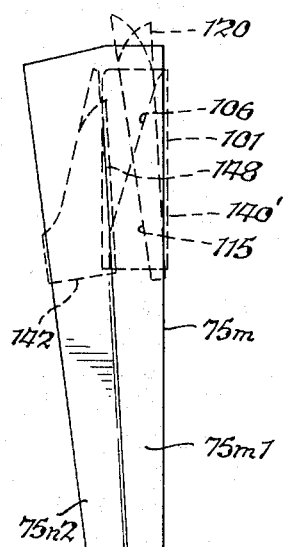

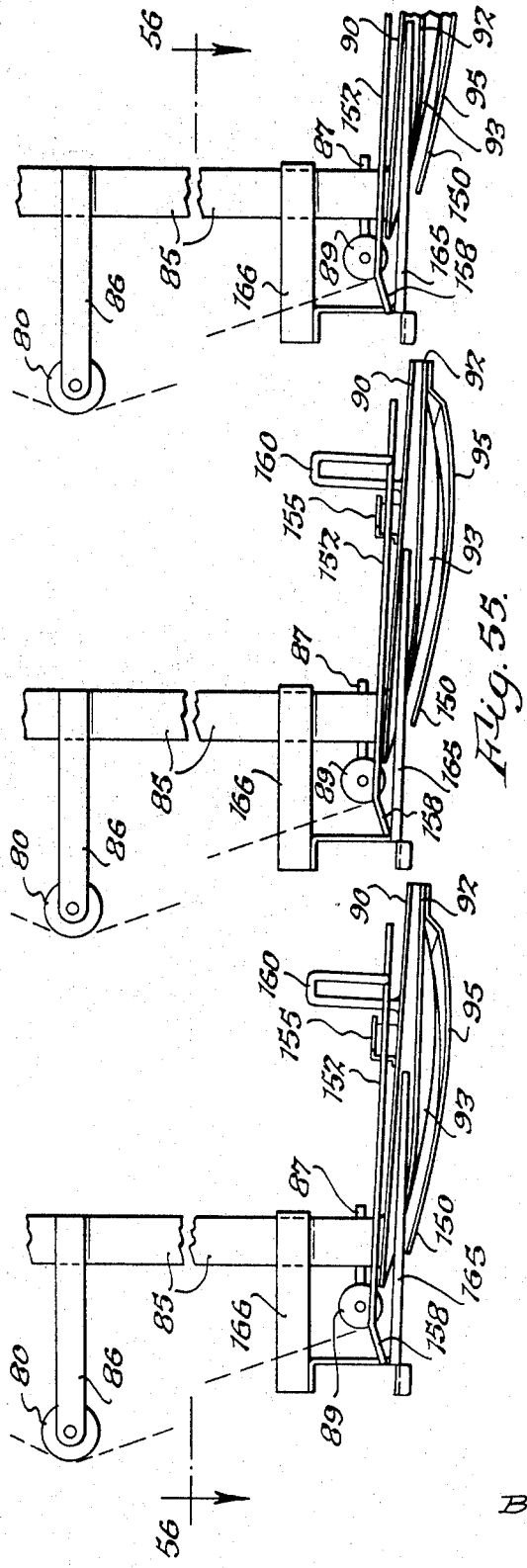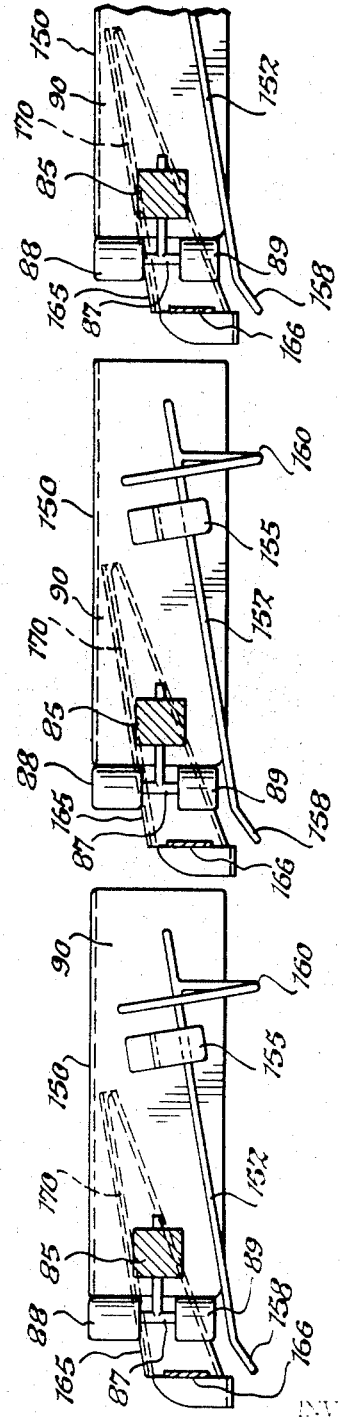
Fig. 55.
Fig. 56.
INVENTORS.
James A. Murphy
Charles A. Lee and
Eduards Spravniks
BY
ATTORNEYS.

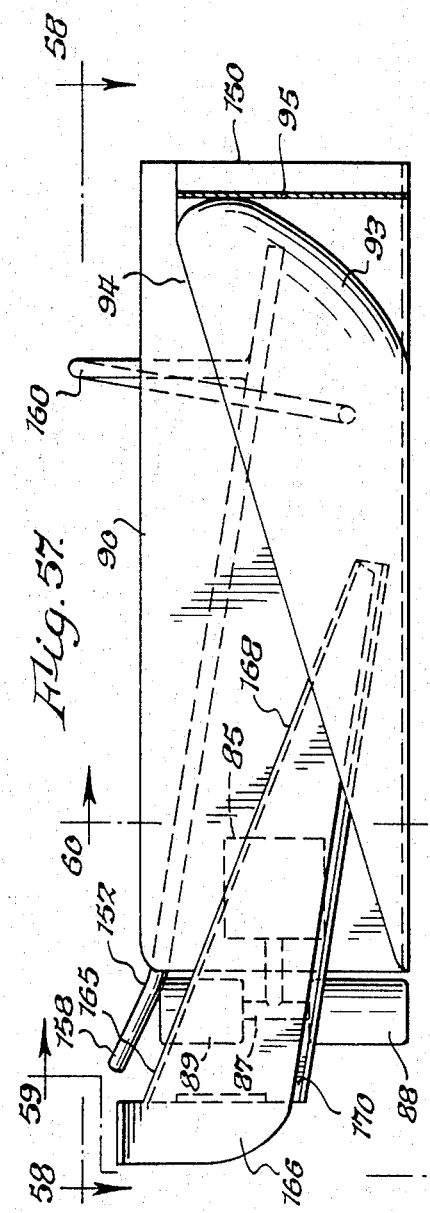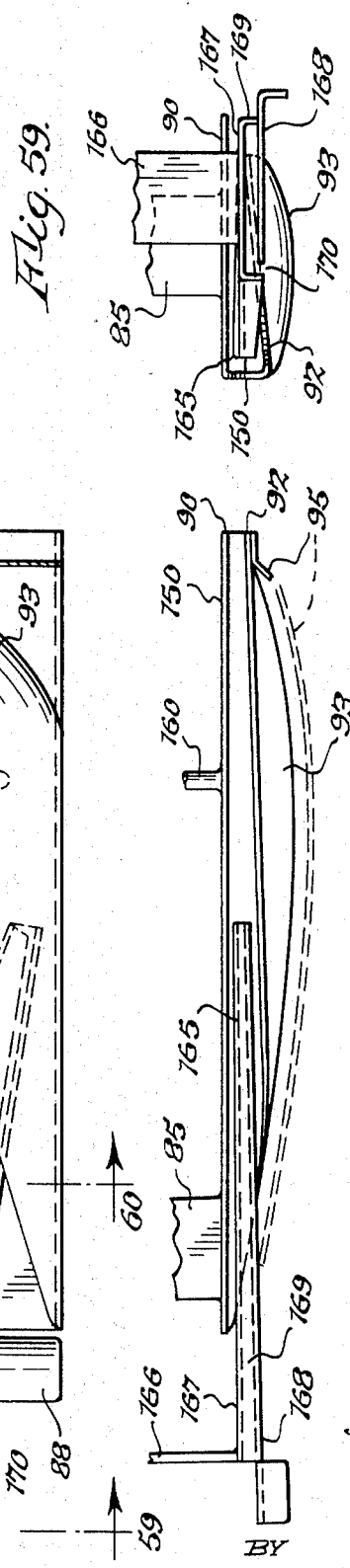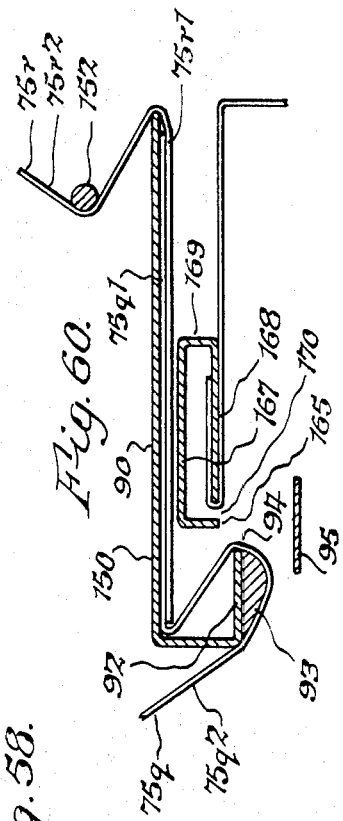

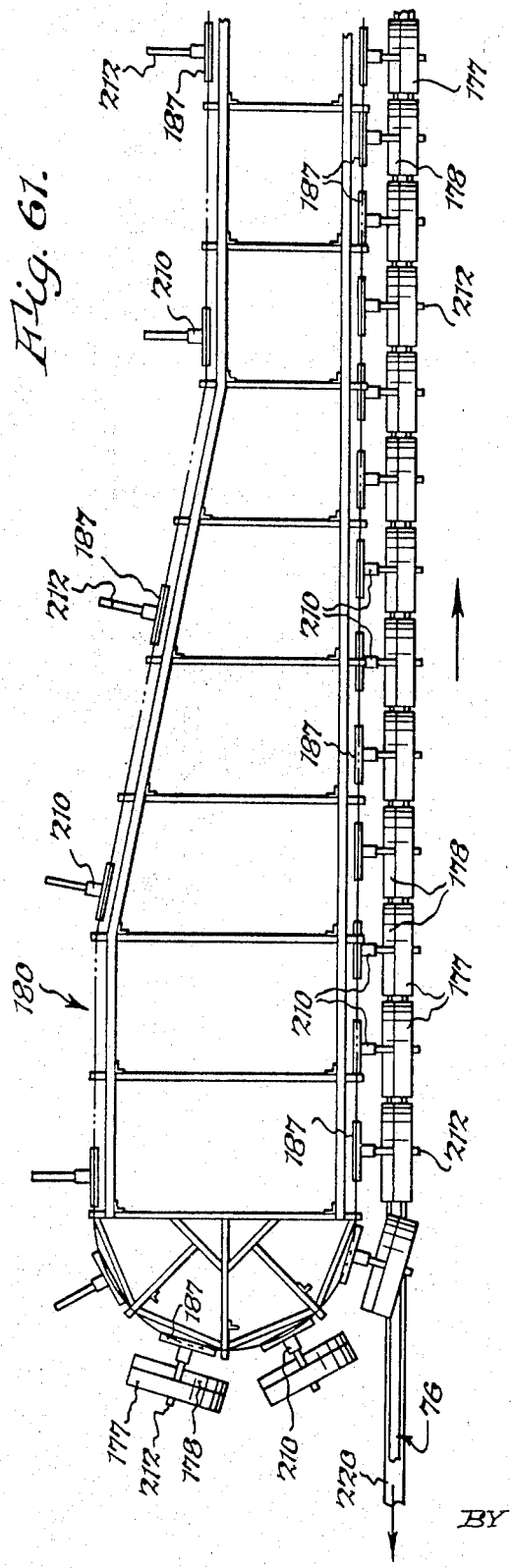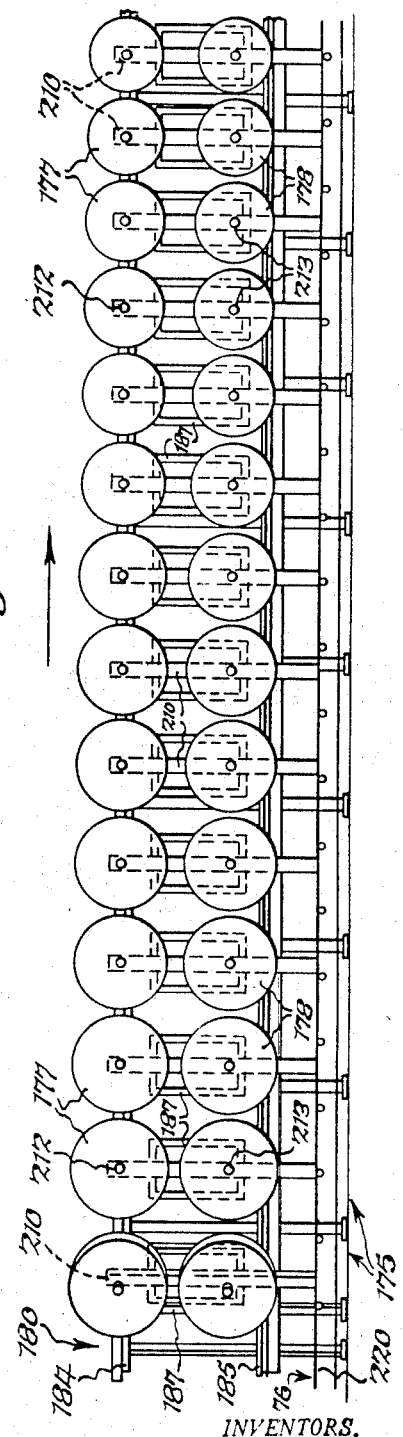

Oct. 14, 1969   J. A. MURPHY ET AL   3,472,504
WEB FOLDING APPARATUS AND METHOD
Filed Aug. 2, 1966   25 Sheets-Sheet 21

INVENTORS.
James A. Murphy
Charles A. Lee and
Eduards Spravniks
BY
ATTORNEYS.

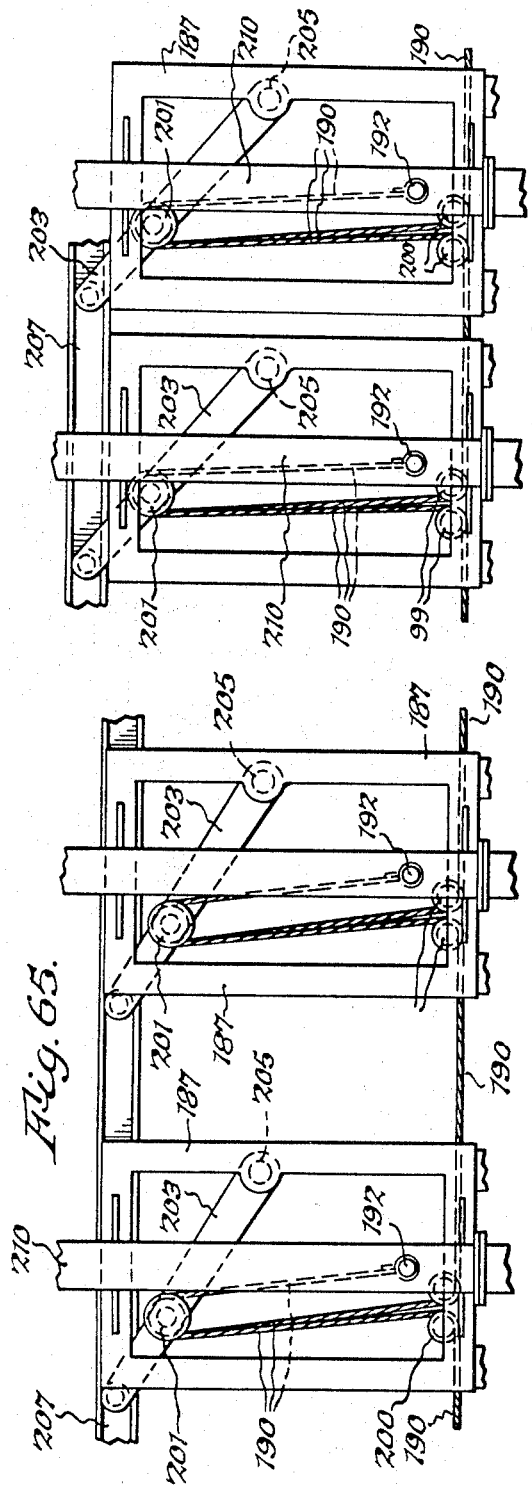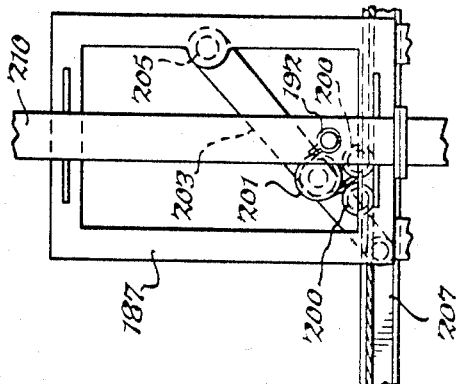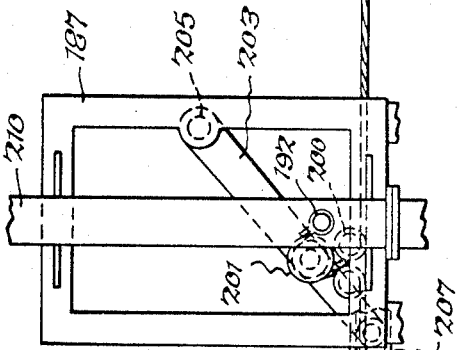

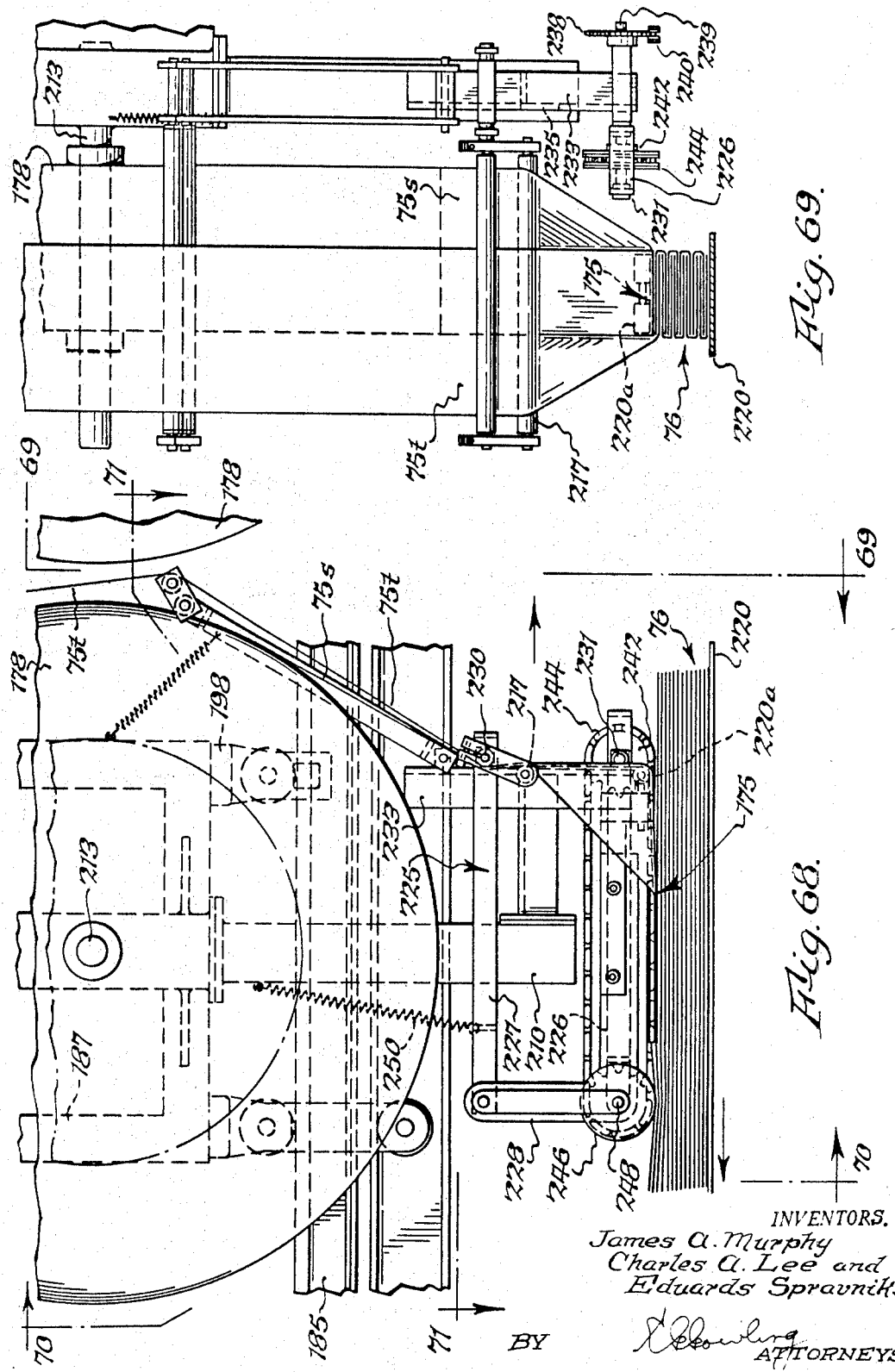

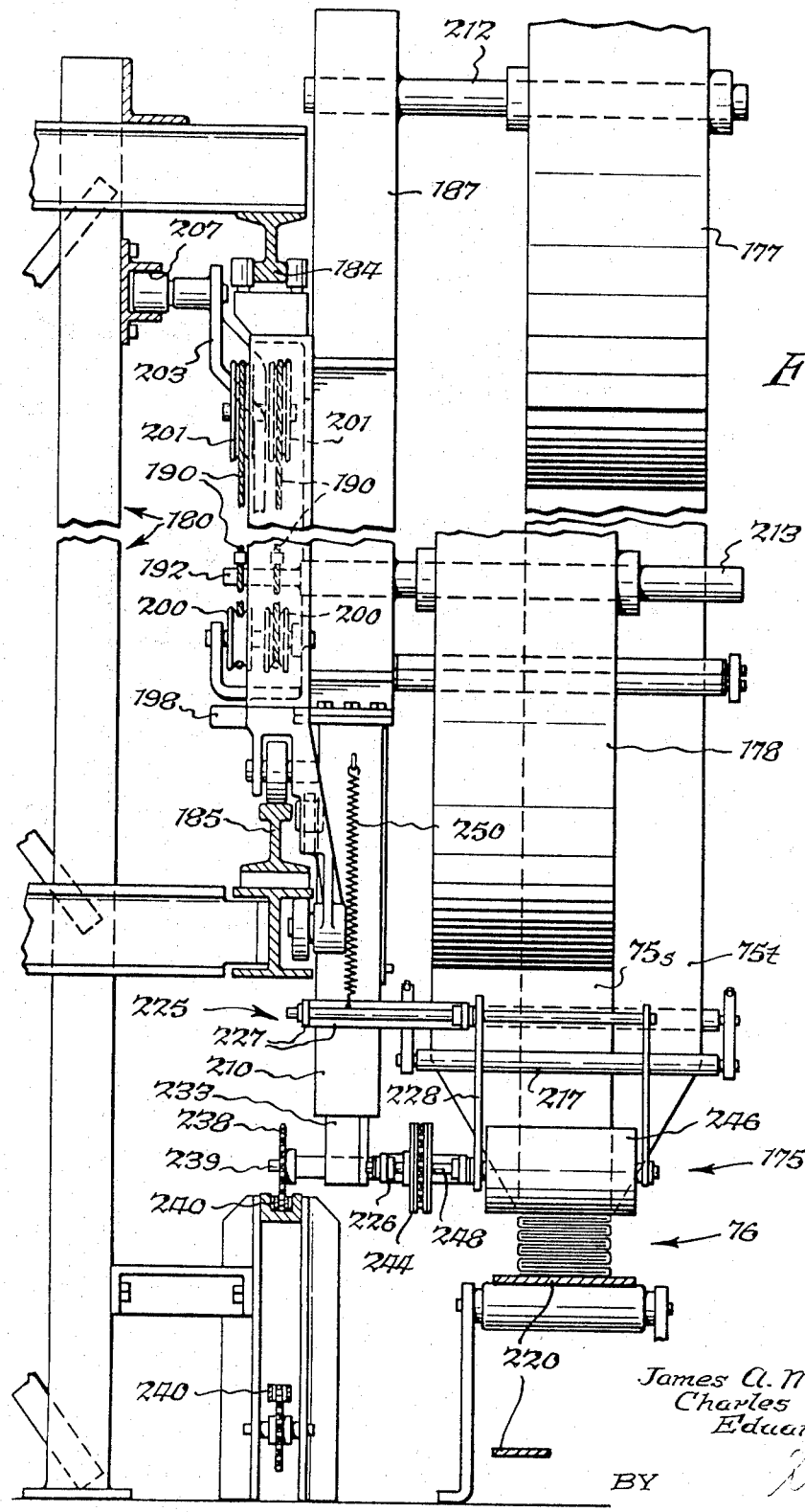

Oct. 14, 1969  J. A. MURPHY ET AL  3,472,504
WEB FOLDING APPARATUS AND METHOD
Filed Aug. 2, 1966  25 Sheets-Sheet 25
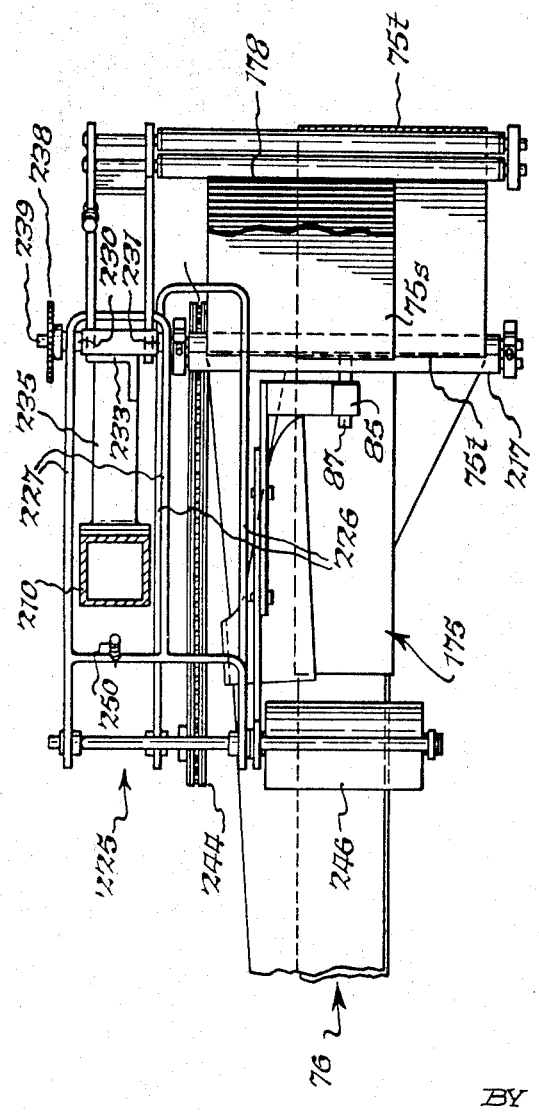
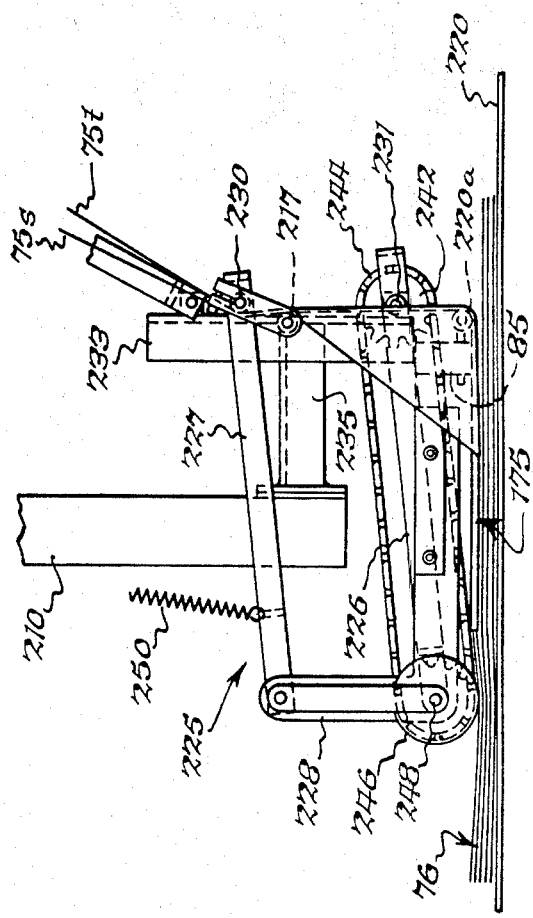
INVENTORS.
James A. Murphy
Charles A. Lee and
Eduards Spravniks
BY
ATTORNEYS.

United States Patent Office
3,472,504
Patented Oct. 14, 1969

3,472,504
WEB FOLDING APPARATUS AND METHOD
James A. Murphy, Toronto, Ontario, Canada, Charles A. Lee, Knoxville, Tenn., and Eduards Spravniks, Weston, Ontario, Canada, assignors to Canadian International Paper Company, Montreal, Quebec, Canada, a corporation of Canada
Filed Aug. 2, 1966, Ser. No. 569,671
Int. Cl. B41l 1/30
U.S. Cl. 270—40                                33 Claims

ABSTRACT OF THE DISCLOSURE

An apparatus and method for interfolding a succession of tissue webs through the use of a series of identical folding devices arranged in spaced-apart relationship with each other along the path of a stack of webs. Each folding device receives a pair of webs in contact with each other and in substantially unfolded condition. Each device is effective to simultaneously (1) substantially completely turn an edge portion of one of the received webs over the stack of webs, thereby forming a left-hand fold, for example, (2) only partially turn over an edge portion of the other received web, to initiate the formation of a right-hand fold, and (3) complete the turning over of a partially folded web from the immediately preceding folding device, thus completing a right-hand fold. A substantial part of the right-hand fold is formed in the space between adjacent folding devices. There is also disclosed a folding machine for moving the folding devices in a direction countercurrent to the direction of movement of the stack of webs and for adjusting the height of the devices in accordance with the height of the stack.

---

This invention relates to an apparatus and method for interfolding a succession of webs, and more particularly has to do with the production and packaging of paper facial tissues and the like with the individual sheets of tissue interfolded with each other in such a manner that when placed in a box the withdrawal of one tissue will expose the succeeding tissue for easy withdrawal, a feature sometimes designated as "pop-up tissue."

Although the present invention is useful wherever a stack or package of interfolded webs is required, one particularly advantageous use is in the facial tissue field. As more fully described in copending U.S. application Ser. No. 265,303, filed Mar. 7, 1963, by Perry O. Pherson, James A. Murphy and Cecil H. Watkins, now Patent No. 3,285,599, a commercial consumer size box of tissue illustratively may contain 360 separate sheets of tissue in short lengths cut from a long stack. In facial tissue operations of this type, the stack is built up by bringing together 360 separate tissue webs from 360 separate supply rolls of tissue which are carried on extended rows of roll supports on a machine which heretofore has been very long and cumbersome, perhaps 200 to 300 feet long. As the webs are assembled in the stack, they are interfolded by a series of folding devices to produce one or more longitudinal folds on each web. The assembled stack is cut off into convenient lengths which are then packaged in wrappers or paperboard boxes of a size suitable for use by the consumer.

Because in the ordinary machine rolls become exhausted and have to be replaced in a random manner, machine operators must walk up and down the machine to look for exhausted rolls and to load fresh tissue supply rolls on an indiscriminate and somewhat unpredictable schedule. At the same time they must watch long runs of tissue which are easily subject to breakage. When that happens, the entire stack often has to be scrapped causing much wastage of paper.

In addition to the difficulties encountered because of the cumbersome and expensive characteristics of the folding machines used heretofore, such machines have exhibited numerous other disadvantages. For example, in many prior machines of this type the individual folding devices attempted to form sharp folds in the paper webs and tended to produce unwanted creases and wrinkles in the webs. These creases and wrinkles were of special moment during the interfolding of the topmost web at a given point along the length of the stack with a preceding web disposed therebeneath, with the result that at least the wrinkled portion of the stack sometimes had to be discarded. Another difficulty arose heretofore because of the need, in many prior machines, for making different types of folding devices. As an illustration, in several previous machines there have been employed alternate folding devices of different design for respectively producing a left-hand fold and then a right-hand fold in successive webs. Still further problems have arisen because many prior machines utilized at least one folding device, and sometimes more than one, for each of the webs being assembled in the stack. As a result, the machines required an unnecessarily large number of threading operations to position the webs within the folding devices, and the length of the machines was excessive in many instances.

One general object of this invention, therefore, is to provide a new and improved apparatus and method for interfolding a succession of webs.

More specifically, it is an object of this invention to provide such apparatus and method which avoids the unnecessary formation of creases and wrinkles in the webs being folded.

Another object of this invention is to provide an apparatus and method of the character indicated in which individual folding devices need not be of different construction from one device to another.

A further object of this invention is to provide apparatus for interfolding a plurality of webs in which the number of folding devices for a given number of webs is substantially reduced.

Still another object of this invention is to provide an improved folding machine of substantially reduced size.

A still further object of the invention is to provide a novel method for interfolding a succession of webs in stacked relation.

An additional object of the invention is to provide a web folding machine utilizing comparatively simple mechanical elements which is economical to manufacture and thoroughly reliable in operation.

In one illustrative embodiment of this invention, there is provided a machine and method for automatically interfolding a plurality of webs from a series of supply rolls or other source. The webs are received from the source by a conveyor which is effective to advance the webs in an assembled stack along a predetermined path. A plurality of folding devices of unique construction and arrangement are disposed in spaced-apart relationship with each other along the path of the stack. These folding devices are operable to interfold the webs into the stack by turning over their edge portions and placing them so that the edge portion of one web lies between the edge portions of another web. The thus interfolded stack is then cut to appropriate lengths for packaging and delivery to the purchaser.

In accordance with one feature of several advantageous embodiments of the invention, a part of the turning over of an edge portion for a given web takes place in the space between adjacent folding devices. As an illustration, in certain of these embodiments a particular folding device is effective to only partially turn over an edge portion of a web received thereby, the turning over continues as the web moves from that folding device to the succeeding folding device, and the succeeding device completes the turning over of the edge portion. By folding a part of the web in the space between the adjacent folding devices, the changes in direction of the edge portion are less abrupt, with the result that the incidence of unwanted creases or wrinkles is substantially reduced.

In accordance with another feature of the invention, in certain preferred embodiments, the adjacent folding devices are of substantially identical construction, thereby eliminating the need for employing different fabrication and threading techniques for the devices.

In accordance with still another feature of the invention, in several good arrangements, the webs to be folded are arranged in pairs with the webs in each pair being advanced to a single folding device in contact with each other and in substantially unfolded condition. Each folding device simultaneously handles two webs, such that the total number of devices is approximately one-half the number of webs being folded into the stack. In some embodiments, the webs in a given pair are interfolded into a previously laid-down pair prior to the completion of the folding of the previous pair. With this arrangement, the handling of the webs is maintained at a minimum, and a further reduction is realized in the incidence of unwanted creases and wrinkles.

The present invention, as well as further objects and features thereof, will be understood more clearly and fully from the following description of certain preferred embodiments, when read in conjunction with the accompanying drawings, in which:

FIGURE 1 is a perspective view looking downwardly along one side of a portion of a tissue machine having folding devices in accordance with one illustrative embodiment of the invention;

FIGURE 2 is a perspective view of the portion of the machine shown in FIGURE 1 looking downwardly toward the other side of the machine;

FIGURE 3 is a perspective view looking upwardly toward the same side of the machine as that shown in FIGURE 1;

FIGURE 4 is a perspective view looking upwardly toward the same side of the machine as that shown in FIGURE 2;

FIGURE 5 is a side elevational view of the folding devices and associated parts illustrated in FIGURE 1;

FIGURE 6 is a top plan view of the folding devices, with portions shown in section, taken along the line 6—6 in FIGURE 5;

FIGURE 7 is a bottom plan view of one of the folding devices shown in FIGURE 1, with its protective shield broken away to illustrate the internal structure;

FIGURE 8 is a side elevational view of the folding device as seen from the line 8—8 in FIGURE 7, with the location of the shield shown by dotted lines;

FIGURE 9 is an end elevational view of the folding device as seen from the line 9—9 in FIGURE 8, with the shield location again shown by dotted lines;

FIGURE 10 is a sectional view taken along the line 10—10 of FIGURE 8;

FIGURE 11 is a bottom plan view of two of the folding devices shown in FIGURE 1, with certain parts broken away;

FIGURES 12–16 are vertical sectional views through one of the folding devices respectively taken along the lines 12—12 to 16—16 of FIGURE 11, showing the progressive interfolding of four successive tissue webs, the points at which the sections are taken also being indicated at 12–16 in FIGURE 1;

FIGURES 17–21 are vertical sectional views similar to FIGURES 12–16 but showing the progressive interfolding of additional tissue webs as they move through a succeeding folding device, the points at which the sections are taken being indicated at 17–21 in FIGURE 1;

FIGURES 22 and 23 are views similar to FIGURES 5 and 6, respectively, but showing a modification of the folding devices;

FIGURE 24 is an enlarged fragmentary sectional view taken along the line 24—24 of FIGURE 22 showing a disengageable connection between the folding devices;

FIGURES 25–29 are views in general similar to respective FIGURES 5, 6, 8, 9 and 10 but showing folding devices constructed in accordance with another illustrative embodiment of the invention;

FIGURES 30 and 31 are bottom plan views similar to FIGURE 11 but showing two of the folding devices of FIGURES 25–29;

FIGURE 32 is a reduced top plan view of the folding devices of FIGURES 30 and 31, together with portions of the tissue webs folded thereby;

FIGURES 38–43 are views in general similar to respective FIGURES 5, 6, 8, 9, 10 and 11 but showing folding devices constructed in accordance with still another illustrative embodiment of the invention;

FIGURES 44–53 are vertical sectional views respectively similar to FIGURES 12–21 but showing the progressive interfolding of successive webs by the folding devices of FIGURES 38–43;

FIGURE 54 is a reduced top plan view of the folding devices of FIGURE 39, together with portions of the tissue webs folded thereby;

FIGURES 55–56 are views in general similar to respective FIGURES 5–9 and 12 but showing folding devices constructed in accordance with a further embodiment of the invention;

Figure 62:
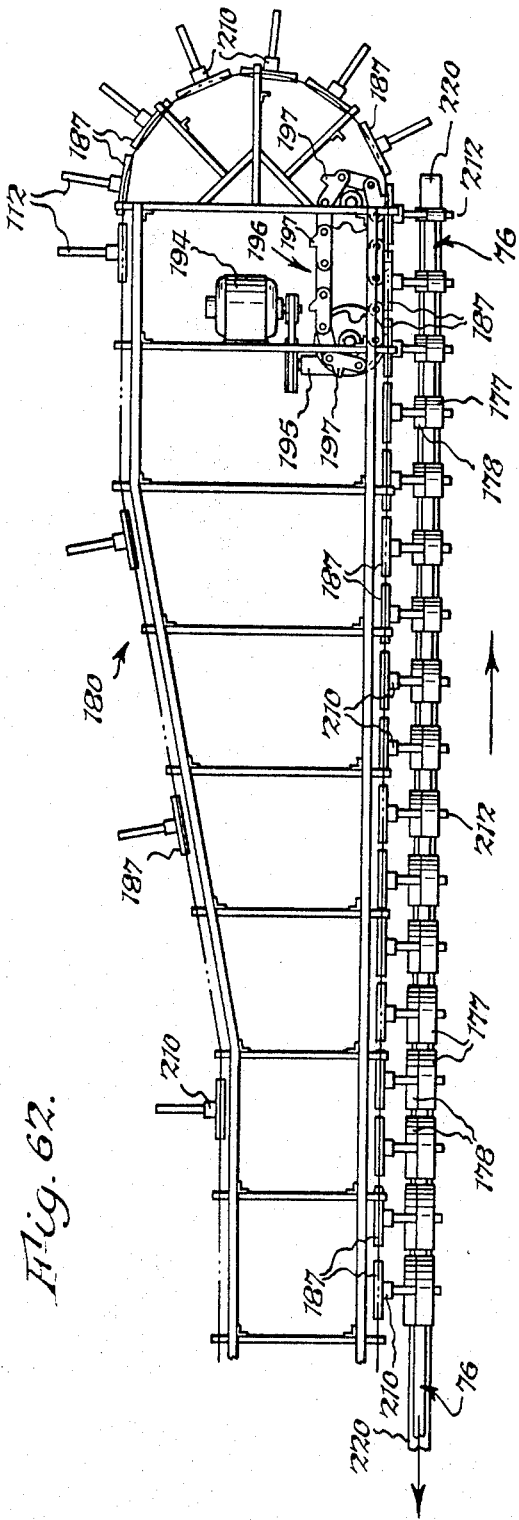
Figure 64:
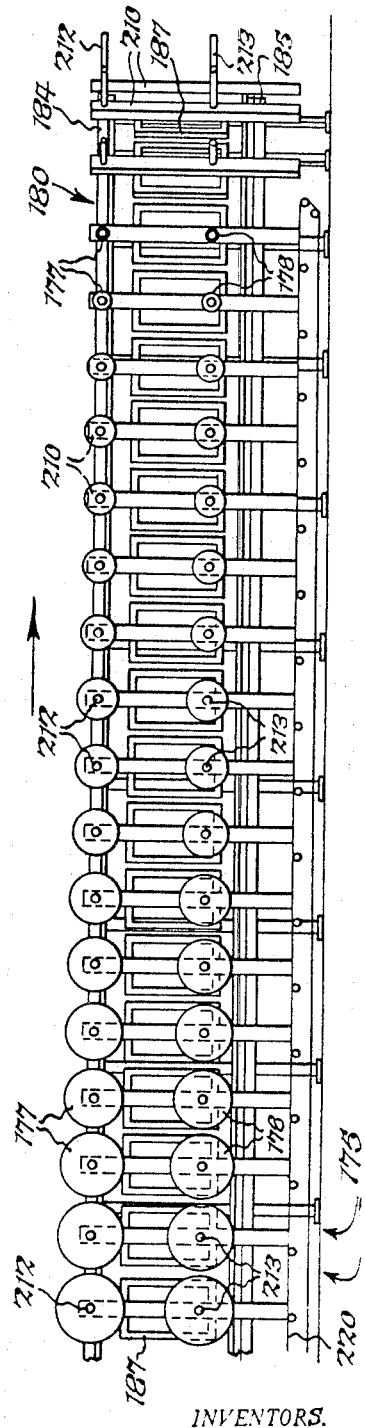

FIGURES 61 and 62 taken together comprise a top plan view of a tissure machine which may be provided with folding devices in accordance with any of the various embodiments of the invention illustrated in FIGURES 1–60;

FIGURES 63 and 64 taken together comprise a side elevational view of the machine of FIGURES 61 and 62;

FIGURES 65–67 are partial enlarged elevations of the machine, with parts removed for clarity, showing the closure means including the linkages and cams for bringing the web roll supports closer together and wider apart during their movement by the conveyor mechanism;

FIGURE 68 is an enlarged partial side elevational view corresponding to FIGURES 63 and 64 showing a lower web roll on its support and a folding device interfolding two webs of tissue from the lower and upper web rolls into a stack of interfolded tissue;

FIGURE 69 is an enlarged partial end elevation taken partly in section on the line 69—69 of FIGURE 68;

FIGURE 70 is an enlarged partial end elevation taken partly in section on the line 70—70 of FIGURE 68 showing details of the conveyor means for the folding device and web roll supports;

FIGURE 71 is a partial plan view taken partly in section on the line 71—71 of FIGURE 68; and FIGURE 72 is a partial elevation similar to a portion of FIGURE 68 but showing a different position of the folding device on a low stack of tissues.

In order to facilitate the description of the various folding devices for the machine illustrated in the drawings, there will first be given a description of the general folding procedure for such devices, with particular reference to the folding devices shown in FIGURES 1–4 and 12–21 of the drawings. That is, before describing the detailed construction of the different embodiments of folding devices, a description will be given of their overall function in interfolding a plurality of webs into a stack. There will then be described the construction and operation of the machine itself.

GENERAL FOLDING PROCEDURE

Referring initially to FIGURES 1-4, there is shown a plurality of facial tissue webs 75 which are to be interfolded and assembled into an elongated stack 76 by a series of folding devices 77. In the drawings, the reference numerals for the tissue webs 75 and the folding devices 77 are respectively followed by an alphabetical suffix and one or more "prime" symbols (') in order to differentiate therebetween. The folding devices are disposed in spaced-apart relationship with each other along a predetermined path defined by the stack 76. Each of these folding devices is operable to interfold a pair of the webs into the stack by simultaneously turning over their edge portions and placing them so that the edge portion of one web lies between the edge portions of another web. The assembled stack of webs is advanced along its path by a suitable conveyor mechanism (not shown in FIGURES 1-4) and is cut off into finished lengths which are then packaged in wrappers or paperboard boxes for the consumer.

The paper webs 75 are fed from their supply rolls (not shown in FIGURES 1-4) to the folding devices 77 in prearranged pairs of webs such that the webs in each pair reach a single one of the folding devices with the webs in contact with each other in substantially unfolded condition. Thus, a pair of webs 75a and 75b is directed around a guide roll 78 to the folding device 77', and a pair of webs 75c and 75d is led around a guide roll 79 to the folding device 77". Similarly, a succeeding pair of webs, only one of which (the web 75e is shown in FIGURES 1-4, is advanced around a guide roll 80 to the folding device 77'''.

The folding devices 77 are of identical construction and are each effective to form median folds in the webs 75 received thereby by only partially turning over an edge portion of one of the received webs and by substantially completely turning over an edge portion of the other received web. The turning over of the edge portion of the first of the webs continues as the web moves through the space between adjacent folding devices and is completed by the immediately succeeding folding device. Prior to completing the fold, the succeeding device begins the interfolding of the following pair of webs into the stack. The arrangement is such that each folding device is effective to fold portions of three different webs and to complete the folding of two webs. The folding of each of the three web portions takes place simultaneously, with the result that the number of folding devices for a given number of webs is substantially less than would otherwise be the case.

FIGURES 12-21 are helpful in further clarifying the folding action of the individual folding devices 77. FIGURES 12-15 illustrate the four webs 75a, 75b, 75c and 75d as they move through the folding device 77", FIGURE 16 illustrates the folding action which takes place in the space between the folding device 77" and the succeeding folding device 77''', FIGURES 17-20 illustrate the webs as they move through the folding device 77''', and FIGURE 21 illustrates the webs as they emerge from the device 77'''. As best shown in FIGURE 12, the previously laid down pair of webs 75a and 75b is disposed adjacent the lower portion of the folding device 77" with the edge portions 75a1 and 75b1 thereof in overlapping relationship with each other. At this point in the folding operation, the folding of the webs 75a and 75b has not yet been completed, and the edge portion 75b2 of the web 75b has been only partially turned over to form the fold. As the succeeding pair of webs 75c and 75d enter the folding device 77", the inwardly directed edge portion 75c1 of the web 75c is positioned above and in overlapping relationship with the inwardly directed edge portion 75d1 of the web 75d. The outer edge portions 75c2 and 75d2, on the other hand, are located externally with respect to the folding device on opposite sides thereof.

As the web 75c proceeds along the folding device 77" to the position shown in FIGURE 13, the edge portion 75c1 remains in its position above the edge portion 75d1, while the turning over of the edge portion 75c2 is initiated to bring this latter edge portion into interfolded relationship with the edge portion 75b2 of the preceding web 75b. The edge portion 75c2 is disposed immediately beneath the edge portion 75b2, and the turning over of the edge portion 75b2 is completed shortly thereafter when the webs reach the approximate longitudinal midpoint of the folding device 77". Upon continued movement of the web 75c through the folding device 77" to the respective positions indicated in FIGURES 14 and 15, the turning over of the edge portion 75c2 continues uniformly, until by the time the web 75c leaves the folding device the folding thereof is completed. The arrangement is such that the web 75c is completely folded during its movement through a single folding device and, as best shown in FIGURE 16, is arranged with its edge portion 75c2 interposed between the edge portion 75b2 and the edge portion 75a1.

The movement of the web 75d through the folding device 77", on the other hand, is effective to only partially turn over its edge portion 75d2. As the web 75d enters the folding device 77" and reaches the position shown in FIGURE 12, the edge portion 75d2 is contacted by an angularly disposed rod 96" which begins to fold the edge portion over the edge portion 75c1 of the web 75c. The turning over of the edge portion 75d2 continues progressively through the positions shown in FIGURES 13 and 14 until by the time the web 75d move through the FIGURE 15 position and leaves the folding device 77", approximately one-half of the edge portion 75d2 has been folded over the edge portion 75c1 but the remaining half has not yet been folded. The folding of one-half of the edge portion 75d2 takes place simultaneously with the complete folding of the edge portion 75c2.

As best shown in FIGURE 16, the turning over of the edge portion 75d2 continues as the web 75d moves through the space between the folding device 77" and the succeeding folding device 75'''. At the time the web 75d enters the folding device 77''' and reaches the position shown in FIGURE 17, the major part of the edge portion 75d2 has been positioned above the edge portion 75c1, but the remaining part has not yet been turned over. As the web 75d continues its movement through the folding device 77''', a progressively greater part of the edge portion 75d2 is turned over, until by the time the web passes the midpoint of the folding device and reaches the position shown in FIGURE 19, the turning over of the edge portion 75d2 has been completed. During its movement through the entire length of the folding device 77''', the edge portion 75d2 is maintained in spaced relationship with the edge portion 75c1 of the preceding web 75c and is not completely interfolded into the stack until the immediately following web 75e has been laid down.

In a similar manner, the succeeding pair of webs 75e and 75f is acted upon by the folding device 77'''' to substantially completely turn over an edge portion of the web 75e but to only partially turn over an edge portion of the web 75f. Upon movement of the web 75e through the successive positions shown in FIGURES 17-21, the outer edge portion 75e2 is completely folded beneath the inner edge portion 75e1 with the edge portion 75d2 and 75f1 disposed therebetween. The edge portion 75f2 of the web 75f, on the other hand, is only partially positioned above the edge portion 75f1. By the time the web 75f leaves the folding device 77'''' and reaches the position shown in FIGURE 21, slightly over one-half of the edge portion 75f2 has been turned over the edge portion 75f1, with the edge portion 75e1 inserted therebetween, while the remaining part of the edge portion 75f2 is still in its unfolded condition. The turning over of the edge portion 75f2 continues in the space between the folding device 77'''' and the immediately succeeding folding device (not shown) and is completed by this latter device.

It will thus be apparent that each of the folding devices 77 receives two of the webs 75 in unfolded condition and is effective to simultaneously (1) substantially completely turn over an edge portion of one of the received webs, thereby forming a left-hand fold, (2) only partially turn over an edge portion of the other received web, to initiate the formation of a right-hand fold, and (3) complete the turning over of a partially folded web received from the immediately preceding folding device, thus completing a right-hand fold. The arrangement is such that a portion of the folding operation takes place in the space between adjacent folding devices, and there is a total of not more than one folding device for each pair of webs.

The folding devices 77

As best shown in FIGURES 5 and 6, each of the folding devices 77 is supported by an upstanding column 85. Although the various folding devices illustrated in detail in FIGURES 1–60 of the drawings are rigidly affixed to the lower ends of the columns 85, it will be apparent from FIGURES 61–72 and the corresponding description of the machine that in many cases the folding devices are movably connected to the columns, for purposes that will be more fully explained hereinafter. An arm 86 extends horizontally from each of the columns 85 and is provided at its free end with the corresponding guide roll 78, 79 or 80. Positioned adjacent the lower portion of the column 85 is a T-shaped arm 87 which carries two rollers 88 and 89. The tissue webs 75 in each pair are directed along the corresponding roll 78, 79 or 80 and then around the rollers 88 and 89 such that, at the time the webs enter the folding devices 77, they are disposed in partially overlapping relationship with each other in substantially unfolded condition.

Each of the folding devices 77 includes a rectangular plate 90 which is affixed adjacent the rearward portion of its upper surface to the lower end of the corresponding column 85. The plate 90 extends in a forward direction from the column 85 along the path of the stack 76 (FIGURE 1) in a generally horizontal but slightly sloping plane. As best seen in FIGURE 10, the plate 90 is bent over to form a triangular lower portion 92 which is disposed immediately beneath the remaining portion of the plate in spaced relationship therewith. An arcuate member 93 is affixed to the lower surface of the portion 92 to provide a smoothly curving surface for the tissue webs. The portion 92 and the member 93 include a combined edge 94 which extends diagonally across the folding device from the rearward or lower left-hand side thereof, as viewed in FIGURE 7 to the forward or upper right-hand side. The angular edges 94 of all of the folding devices in the machine are parallel to one another and are uniformly disposed in a horizontal plane adjacent the stack of webs being folded.

Supported beneath the arcuate member 93 is a curved shield 95 which is shown in full lines in FIGURES 1 and 5 and in dotted lines in FIGURES 8–10. The shield 95 is substantially coextensive with the rectangular plate 90, and its forward portion is welded or otherwise rigidly affixed to the lower porton 92 of the plate. The remaining portion of the shield 95 is in spaced relationship with the arcuate member 93 and is bowed downwardly to exert a slight bearing pressure on the stack of webs passing therebeneath.

Three angularly disposed rods 96′, 96″ and 96‴ (FIGURE 6) are respectively positioned above the upper surfaces of the folding devices 77′, 77″ and 77‴. Each of these rods is supported by a second rod 97 which is secured to the upper surface of the rectangular plate 90 and is bent to form an upstanding loop. The rod 97 maintains the corresponding angularly disposed rod 96′, for example, in a position which extends from a rearward corner of the folding device 77′, across the space between the device 77′ and the succeeding folding device 77″ and into the folding device 77″ to approximately the longitudinal midpoint thereof, where the forward end of the rod 96′ is located between the upper portion of the plate 90 and the bent over portion 92 for this latter device. The rod 96′ is oriented in a substantially horizontal plane but slopes downwardly slightly in a forward direction to fit between the two portions of the plate. The rods 96′, 96″ and 96‴ extend in parallel directions which are opposite to the directions of the angular edges 94. The rearward portion of each rod includes a bent end 98.

As a pair of superimposed webs 75c and 75d (FIGURES 12–21) move around the rollers 88 and 89 and enter the corresponding folding device 77″, the overlapping edge portions 75c1 and 75d1 of the webs pass immediately beneath the upper portion of the rectangular plate 90. The uppermost web 75c is longitudinally bisected by the rearward portion of the arcuate member 93, and the edge portion 75c2 is progressively folded beneath the edge portion 75b2 of the web 75b in the manner described heretofore by the angular edge 94. The edge 94 is effective to complete the folding of a left-hand fold in the web 75c by the time the web leaves the folding device 77″.

The lowermost web 75d is longitudinally bisected by the bent end 98 of the rod 96″ as it enters the folding device 77″. The end 98 serves to smoothly guide the entry of the web 75d between the plate 90 and the shield 95. The edge portion 75d1 of the web is disposed immediately beneath the upper portion of the plate, while the edge portion 75d2 extends externally with respect to the folding device and is guided by a bent rod 99. As best shown in FIGURES 2 and 3, the rod 99 is supported at one end by the column 85, and the rod extends downwardly at an angle with respect thereto in position to contact the edge portion 75d2 and thereby avoid sharp bends in its path of travel.

Upon continued movement of the web 75d through the folding device 77″, the angularly extending rod 96″ progressively folds the edge portion 75d2 over the upper surface of the rectangular plate 90. During its movement along the upper surface of the plate 90, the edge portion 75d2 passes through the looped rod 97 (FIGURE 1), and by the time the edge portion leaves the folding device 77″ approximately one-half of its width has been turned over to form one-half of a right-hand fold.

As the edge portion 75d2 of the web 75d moves through the space between the folding device 77″ and the immediately succeeding folding device 77‴, the turning over thereof continues around the rod 96″. When the edge portion 75d2 reaches the end of the rod 96″ at the approximate midpoint of the folding device 77‴, the turning over is completed, and the edge portion is properly spaced in its FIGURE 19 position between the edge portions 75e2 and 75f1 of the immediately succeeding pair of webs 75e and 75f. The folding device 77‴ is thus effective to complete the turning over of the edge portion 75d2 but to prevent the completion of the interfolding thereof into the stack until after the interfolding of the succeeding webs 75e and 75f has been initiated.

To facilitate the threading of the tissue webs 75 through the folding devices 77, in some embodiments a telescoping rod is substituted for each of the rods 96. In the embodiment shown in FIGURES 22–24, for example, there is provided a rod 96a on each of the devices 77 which is formed from two telescoping sections 96a1 and 96a2. The section 96a1 is supported by the looped rod 97 and extends beyond the forward edge of the rectangular plate 90 into the immediately succeeding folding device. The section 96a2 is slidably mounted within the section 96a1 and in its operative position protrudes into the succeeding device to the approximate midpoint thereof. An elongated slot 96b1 in the forward portion of the section 96a1 accommodates a laterally extending pin 96b2. This pin is affixed to the rearward end of the section 96a2 and is arranged for manual movement from the full line position (FIGURE 25) to the dotted line position, thereby retracting the section 96a2 into the section 96a1. With the section 96a2 in its retracted position, additional clearance is provided in the succeeding folding device which facilitates the threading of the tissue webs therethrough.

The folding devices 77 are particularly advantageous in cases in which the available space on the machine is at a premium. As best seen in FIGURES 5 and 22, the space between the devices 77 is less than one-half of the length of the devices. Each of the devices 77 is of identical construction and has the additional advantage that it employs comparatively few component parts. The path of the tissue webs 75 through the devices 77 is such that abrupt changes in direction are avoided, with the result that the incidence of wrinkles or tears in the web is substantially reduced.

The folding devices 100

Referring now to FIGURES 25–37, there is shown a plurality of folding devices 100 which are constructed in accordance with another particularly advantageous embodiment of the invention. As best shown in FIGURE 32, the spacing between adjacent folding devices 100′ and 100″, for example, is substantially in excess of the length of the devices. In FIGURES 25 and 26, this spacing has been foreshortened for purposes of convenience. Among the numerous advantages of the folding devices 100 is the absence of any elongated rods or other structure therebetween, with the result that the threading of the various tissue webs through the devices is greatly facilitated.

Each of the folding devices 100 includes a substantially rectangular plate 101 which is supported by one of the columns 85 in the manner described heretofore with respect to the rectangular plate 90 (FIGURE 1) of the folding device 77. The plate 101 is provided with a bent over portion 102 extending therebeneath. An arcuate member 104 is affixed to the lower surface of the portion 102, and the member 104 and the portion 102 together define an angularly extending edge 106 (FIGURE 30). The portion 102, the member 104 and the edge 106 are generally similar to the portion 92, the member 93 and the edge 94 of the folding device 77, although the degree of curvature of the lower surface of the member 104 preferably is not as great as that for the member 93. The forward edge of the portion 102 is provided with a substantially flat shield 108 which extends rearwardly therefrom in spaced relationship with the member 104.

Mounted on an angle bracket 112 (FIGURES 25 and 26) adjacent the guide rollers 88 and 89 is a folding finger indicated generally at 115. The finger 115 extends longitudinally into the folding device 100 from the rearwardly disposed end thereof and is located between the upper and lower portions of the rectangular plate 101. As best shown in FIGURE 29, the finger 115 is substantially U-shaped in cross-section and includes two spaced-apart plates 116 and 117 and an interconnecting bight 118. The plate 116 is positioned in spaced relationship with the upper portion of the plate 101, while the plate 117 is located beneath the plate 116 such that its outer edge forms a narrow opening or slot 120 therewith.

As best seen in FIGURE 30, th edges of the plates 116 and 117 are parallel to each other throughout the major portion of their length, and these edges extend in directions such that the slot 120 therebetween is angularly disposed with respect to the folding device 100. The forward or lower portion of the slot 120, as viewed in this figure, is located adjacent the lower left corner of the device 100, and the slot extends upwardly therefrom, with a gradually increasing spacing with respect to the left-hand edge of the device. The angular direction of the slot 120 is opposite to that of the folding edge 106 on the plate 101. The plates 116 and 117 project slightly from each of the ends of the plate 101, and the rearward or upper portions of the plates 116 and 117 are provided with arcuate edges 122 and 123, respectively. These edges facilitate the feeding of a tissue web into the folding finger 115 in a manner that will become more fully apparent hereinafter.

Two loop-shaped rod members 125 and 126 are mounted on the upper surface of the rectangular plate 101. The rod members 125 and 126 form respective slots 127 and 128 (FIGURES 27–29) which extend outwardly from the folding device 100 in a substantially horizontal plane. The rod member 125 is positioned adjacent the rearward portion of the folding device 100, and its slot 127 is somewhat longer than the slot 128 formed by the rod member 126. This latter rod member is located at the forward edge of the folding device. The rod members 125 and 126 are interconnected by a longitudinally extending rod 130 which protrudes a short distance beyond the forward edge of the folding device and is provided adjacent the rearward edge with a bent end 131. The rod 130 is supported a short distance above the upper surface of the plate 101 and forms a small angle with respect to the adjacent longitudinal edge of the plate. As best shown in FIGURE 32, the rod 130 for a given folding device 100′ is in axial alignment with the slot 120 in the folding finger 115 for the immediately succeeding folding device 100″.

Figure 33:
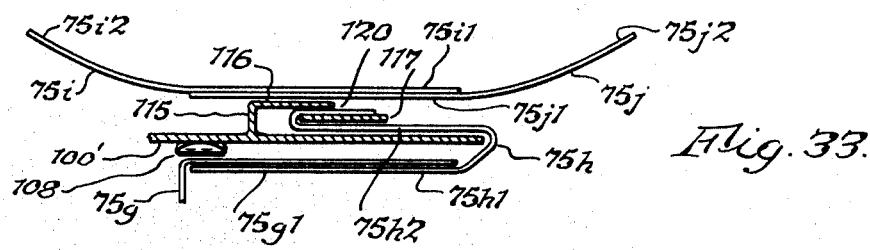
FIGURES 33–37 are vertical sectional views respectively taken along the lines 33—33 to 37—37 in FIGURES 30 and 31 showing the progressive interfolding of four successive tissue webs.

FIGURES 33–37 are illustrative of the progressive movement of the tissue webs through the folding device 100′. Referring to FIGURE 33, there is shown a first pair of webs 75g and 75h laid down by the immediately preceding folding device and a second pair of webs 75i and 75j being advanced to the folding device 100′. The webs 75i and 75j reach the folding device 100′ in overlapping relationship with each other in substantially unfolded condition. As the webs 75i and 75j enter the folding device, the edge portions 75i1 and 75j1 thereof are located immediately above the folding finger 115, while the edge portions 75i2 and 75j2 extend outwardly in a generally horizontal direction.

Figure 34:
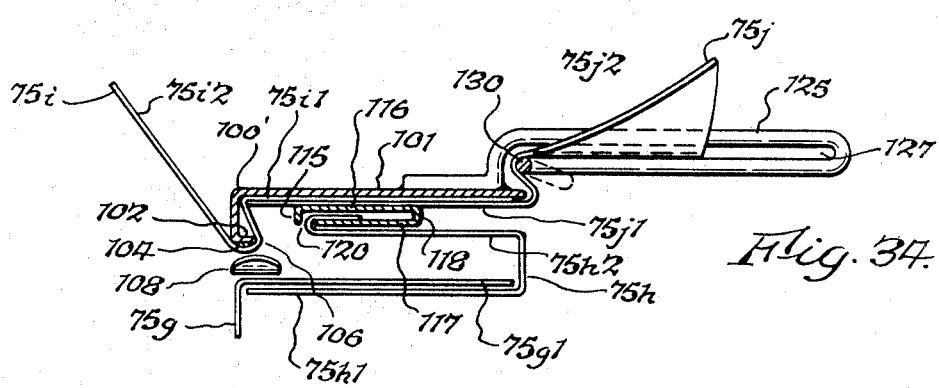
Figure 35:
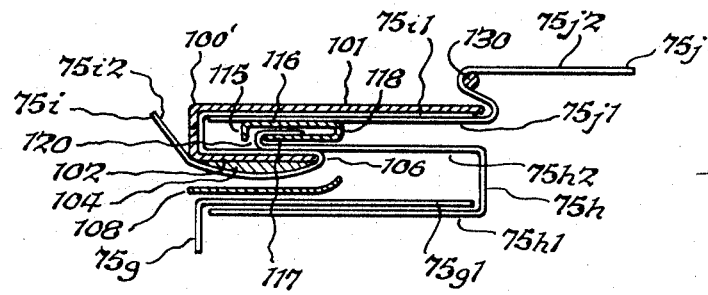
Figure 36:
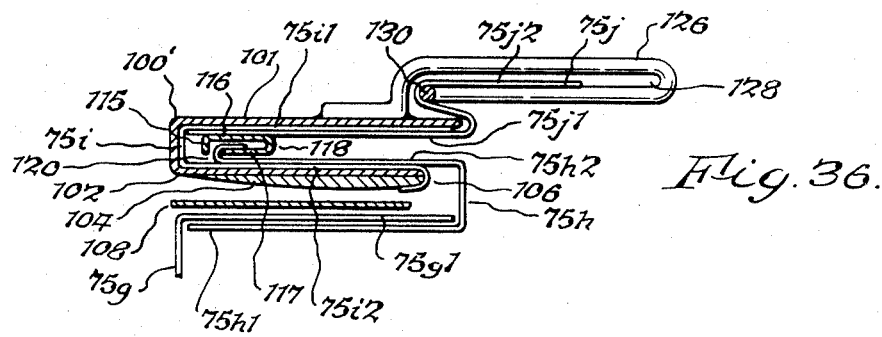
Figure 37:
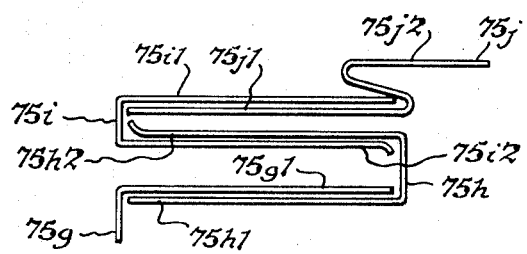

During the movement of the web 75i from the position shown in FIGURE 33 to that shown in FIGURE 34, the edge portion 75i1 passes beneath the upper portion of the rectangular plate 101, while the turning over of the edge portion 75i2 is initiated by the angular edge 106 on the lower portion of the plate. As the web 75i continues through the folding device 100′ to the respective positions shown in FIGURES 35 and 36, the turning over of the edge portion 75i2 continues uniformly, until by the time the web leaves the folding device the turning over of the edge portion 75i2 has been completed. Thus, the angular edge 106 performs a function similar to that described heretofore with respect to the edge 94 (FIGURE 11) on the folding device 77 to completely fold the web 75i during its movement through a single folding device. As the web 75i emerges from the folding device and reaches the position shown in FIGURE 37, the edge portion 75i2 is properly positioned between the edge portion 75g1 of the web 75g and the edge portion 75h2 of the web 75h.

The web 75j, on the other hand, is only partially folded during its movement through the folding device 100′, and this partial folding takes place simultaneously with the complete folding of the web 75i. As the web 75j moves through the successive positions shown in FIGURES 33 and 34, the edge portion 75j1 thereof is directed between the uppor portion of the rectangular plate 101 and the folding finger 115. The opposite edge portion 75j2 is trained outwardly and is contacted by the bent end 131 (FIGURE 30) of the angularly extending rod 130. Shortly after the web 75j leaves the position shown in FIGURE 34, the edge portion 75j2 is led through the slot 127 in the rod member 125, and the rod 130 begins to turn over the edge portion to position it above the upper portion of the plate 101 and the edge portion 75j1. The turning over of the edge portion 75j2 proceeds at a comparatively slow rate, and by the time the web 75j reaches the position shown in FIGURE 36 and passes through the slot 128 formed by the rod member 126, only about one-quarter of the edge portion has been turned over.

The major part of the turning over of the edge portion 75j2 takes place in the space between the folding device 100′ and the immediately succeeding folding device 100″. Thus, as best shown in FIGURE 32, as the web 75j leaves the folding device 100′, its edge portion 75j2 has been turned over to a comparatively small extent. Upon the entry of the edge portion 75j2 into the succeeding folding device 100″, however, the turning over thereof is nearing completion. As the edge portion 75j2 moves through the folding device 100″, the turning over continues, until by the time the edge portion is discharged from the device 100″ it has been completely turned over.

The way in which the web 75j moves through the folding device 100″ is similar to the movement of the web 75h through the folding device 100′ of FIGURES 33–37. As the web 75h enters the device 100′, the edge portion 75h1 is located in its proper position beneath the edge portion 75g1 and the shield 108. The edge portion 75h2 enters the folding finger 115 and is contacted by the arcuate edges 122 and 123 (FIGURE 30) on the folding finger plates 116 and 117. These edges serve to smoothly but affirmatively position the edge portion 75h2 in the slot 120 between the plates such that the edge portion is wrapped around the angularly extending edge of the plate 117. During the movement of the web 75h through the successive positions shown in FIGURES 33–37, the remaining part of the edge portion 75h2 is turned over, and upon the discharge of the web from the folding device 100′, as shown in FIGURE 34, the edge portion 75h2 is interfolded in its proper position between the edge portion 75i2 of the web 75i and the edge portion 75j1 of the web 75j.

The arrangement is such that each of the folding devices 100 is effective to completely turn over an edge portion of one of the webs received thereby by means of the rectangular plate 101 and to simultaneously initiate the turning over of an edge portion of the other received web through the use of the elongated rod 130. The major part of the turning over of this latter edge portion takes place in the space between the folding device and the immediately succeeding folding device, and the turning over is completed by the folding finger 115 of the succeeding device. The other received web is not completely interfolded into the stack of webs until after the succeeding device has received and turned over a subsequent web directed thereto.

The folding devices 140

The folding devices 140 are illustrated in FIGURES 38–53 and are of a construction which is similar in several respects to that of the folding devices 100 described heretofore. Thus, each of the devices 140 includes the rectangular plate 101, the arcuate member 104, the angularly disposed edge 106, the flat shield 108, and the folding finger 115 having the plates 116 and 117 separated by the slot 120. The devices 140 are of identical construction and are spaced apart along the feed path of the stack of webs by a distance which approximates the spacing of the devices 100.

The folding devices 140 differ from the folding devices 100 in the substitution of an outboard folding shoe 142 (FIGURE 43) for the rod members 125, 126 and 130 (FIGURE 30). The folding shoe 142 is of sheet metal construction and extends outwardly from the rectangular plate 101 in substantially coextensive relationship therewith. A pair of brackets 143 serve to rigidly hold the shoe 142 on the upper surface of the plate 101.

The folding shoe 142 is of flattened, U-shaped cross-section and includes an upper plate 145 and a lower plate 146 which are interconnected adjacent the outer, forward portions thereof by a bight 147. The plates 145 and 146 are each positioned above the level of the rectangular plate 101 and are spaced apart to define a slot 148 between their inwardly disposed edges. The slot 148 is oriented in a generally longitudinal direction with respect to the folding device 140 but forms a slight angle therewith. As viewed in FIGURE 43, the slot 148 extends upwardly from the lower or forward edge of the device 140 at a gradually decreasing spacing with respect to the right-hand edge of the device. The slot 148 is parallel to the slot 120 in the folding finger 115 but is opposite to the angular edge 106 on the plate 101. The outer rearward edges of the plates 145 and 146 are of arcuate configuration and form an entrance slot 149 for the tissue web received thereby.

Referring to FIGURES 44–54, the movement of the tissue webs may be followed as they pass through two immediately adjacent folding devices 140′ and 140″. A pair of previously laid down webs 75k and 75l are disposed adjacent the lower portion of the folding device 140′, and a second pair of webs 75m and 75n are advanced thereto in overlapping substantially unfolded condition with the inner edge portions 75m1 and 75n1 thereof disposed immediately beneath the rectangular plate 101 (FIGURES 45–47). As the web 75m is advanced through the folding device 140′, its outer edge portion 75m2 is completely turned over by the edge 106 of the plate 101 in the manner described above to form a left-hand fold. Simultaneously, only a part of the outer edge portion 75n2 of the web 75n is turned over to initiate the formation of a right-hand fold. Thus, after being directed around the roller 89 (FIGURE 43), the edge portion 75n2 enters the outboard folding shoe 142 through the entrance slot 149. As the web 75n moves from the position shown in FIGURE 45 to the position shown in FIGURE 46, its central portion enters the slot 148, and the plates 145 and 146 begin to turn the edge portion 75n2 over the upper surface of the plate 101. The turning over of the edge portion 75n2 continues as the web 75n moves through the position shown in FIGURE 47 and is discharged from the folding device 140′, at which point slightly less than one-quarter of the edge portion has been turned over.

The major part of the turning over of the edge portion 75n2 takes place in the space between the folding device 140′ and the immediately adjacent folding device 140″. A comparison of the position of the edge portion 75n2 immediately after it is discharged from the folding device 140′ (FIGURE 48) and its position as it enters the folding device 140″ (FIGURE 49) indicates that well over one-half of the edge portion has been turned over by the time it passes through the space.

The edge portion 75n2 enters the folding device 140″ between the arcuate edges 122 and 123 (FIGURE 43) of the folding fingers 115 and is inserted in the slot 120 in the manner previously described. The completion of the turning over of the edge portion 75n2 continues throughout the entire length of the folding device 140″ as the web 75n moves through the successive positions shown in FIGURES 50–52. By the time the edge portion 75n2 leaves the folding device 140″ and reaches the position shown in FIGURE 53, it is substantially entirely turned over with only a small curl along its outer edge. This curl disappears immediately thereafter during the movement of the web in the space between the folding device 140″ and the immediately succeeding folding device.

The folding device 140″ similarly is effective to completely turn over an edge portion of a web 75o and to turn over only a small portion of an edge portion of a web 75p. As the webs 75o and 75p move through the successive positions shown in FIGURES 49-53 and are discharged from the forward portion of the folding device 140″, the edge portion 75o2 is completely turned over and is positioned between the edge portion 75m1 of the web 75m and the edge portion 75n2 of the web 75n. The edge portion 75p1 of the web 75p is properly located intermediate the edge portion 75n2 and the edge portion 75o1, while the edge portion 75p2 is only slightly turned over the edge portion 75o1. The completion of the turning over of the edge portion 75p2 does not take place until after the web 75p has traversed the space between the folding device 140″ and the immediately succeeding folding device and has passed completely through this latter device.

It will be noted from FIGURES 49-53 that the completion of the interfolding of the web 75n does not take place until after the edge portion 75o2 of the web 75o has been inserted beneath the edge portion 75n2. With this arrangement, it no longer is necessary to reopen the web 75n in order to insert the edge portion 75o2 therein, with the result that the amount of handling of the web 75n, and hence the possibility of producing wrinkles or tears therein, is substantially reduced.

The folding devices 150

Turning now to FIGURES 55-60, there is shown a series of folding devices 150 in accordance with another illustrative embodiment of the invention. The folding devices 150 include certain of the features of the folding devices 77 (FIGURES 1-24) described heretofore but are modified to also incorporate certain features of the folding devices 100 (FIGURES 25-37). The devices 150 are spaced in close proximity with one another in a manner similar to the devices 77, thus enabling the maximum utilization of the available space on the machine. However, as is the case with the devices 100, there is a complete absence of connecting structure therebetween.

As best shown in FIGURES 55-57, each of the folding devices 150 includes the rectangular plate 90, the arcuate member 93 therebeneath, the angular edge 94 and the curved shield 95 in a manner similar to that described above in connection with the description of the folding devices 77. In place of the rods 96 and 97 (FIGURE 7) on the folding device 77, however, the folding device 150 is provided with an elongated rod 152 which is substantially shorter than the rod 96 and is of a length which approximates the rectangular plate 90. The rod 152 extends at an angle with respect to the folding device 150 from the left upper corner of the plate 90, as viewed in FIGURE 57, toward the right central portion thereof in a direction which is opposite to the angular direction of the edge 94. A bracket 155 on the upper surface of the plate 90 serves to prevent substantial movement of the rod 152, and the rearward end of the rod is bent, as at 158, to perform a function similar to that of the bent end 98 of the rod 96.

Extending upwardly from the upper surface of each of the folding devices 150 is a rod 160. The rod 160 forms a substantially closed loop, and its free end is welded or otherwise secured adjacent the forward portion of the rod 152 to provide support therefor.

A folding finger 165 protrudes inwardly into the rearward portion of each of the folding devices 150. The finger 165 is of a construction which in certain respects is similar to that of the folding finger 115 (FIGURE 30) for the folding devices 100. However, the finger 165 is substantially shorter than the finger 115, and it extends into the folding device 150 to the approximate midpoint thereof. As best shown in FIGURE 60, the finger 165 is of flattened U-shaped cross-section and comprises an upper plate 167 and a lower plate 168 which are interconnected by a bight 169. The free edges of the plates 167 and 168 are spaced apart to form a longitudinal slot 170 therebetween. The slot 170 is angularly disposed with respect to the folding device 150 and extends downwardly from the extreme rearward or left portion of the device, as viewed in FIGURE 57, toward the lower edge thereof. The direction of the slot 170 is parallel to that of the elongated rod 152 and is opposite to the direction of the angular edge 94 on the plate 90.

As a pair of webs 75q and 75r (FIGURE 60) pass through the folding device 150, the edge portions 75q1 and 75r1 thereof are in overlapping relationship with each other beneath the upper portion of the plate 90. The edge portion 75q2 of the web 75q is completely turned over by the angular edge 94 in a manner similar to that described above to form a left-hand fold, while the edge portion 75r2 of the web 75r is only partially turned over by the elongated rod 152 to initiate the formation of a right-hand fold. The turning over of the edge portion 75r2 continues in the space between the folding device and the immediately succeeding folding device and is completed by the folding finger of this latter device at the time the webs reach the approximate midpoint thereof.

The machine

FIGURES 61-72 are illustrative of a tissue folding machine which is effective to control the movement of the various webs being assembled into the stack 76. The machine includes a series of folding devices 175 which are disposed in spaced-apart relationship with each other along the path of the stack 76 and may be in accordance with any of the folding devices described heretofore. Successive pairs of tissue supply rolls 177 and 178 are disposed above the folding devices 175 and are interconnected therewith to travel in a closed path. This path is arranged predominantly around vertical axes and extends in a generally horizontal plane.

The pairs of supply rolls 177 and 178 are movably supported by a framework indicated generally at 180. The framework 180 includes top and bottom trackways 184 and 185 (FIGURE 70) which are disposed along closed paths and which carry a succession of rectangular trolleys 187. As best shown in FIGURES 65-67, these trolleys are connected together in a continuous train by cables 190 which are attached to the trolleys at terminals 192. The train of trolleys is moved by a variable speed drive mechanism including a motor 194 (FIGURE 62), a gear box 195 and a sprocket chain 196. A series of lugs 197 on the sprocket chain 196 engage bosses 198 on two or three of the trolleys which are passing the drive mechanism at any point of time.

The cables 190 connecting the trolleys 187 extend horizontally between pulleys 200 fixed on the trolleys and then upwardly over pulleys 201. The pulleys 201 are mounted on cam arms 203 which are arranged to be swung generally up and down on pivots 205 on the trolleys. The outer ends of the cam arms 203 are guided upwardly and downwardly by stationary cam track 207 on the framework 180 around the closed path.

The cables 190, the cam arms 203, the cam track 207 and associated mechanisms act as closure means which operate progressively to bring the trolleys 187 closer together or wider apart in accordance with the respective upward and downward rotative positions of the cam arms 203. The positions of the arms 203 are determined by the varying relative height of the cam track 207 as the trolleys move in the closed path around the tracks 184 and 185.

Each trolley 187 has mounted on it a column 210 which as perhaps best seen in FIGURE 70 carries upper and lower web roll supports 212 and 213 for the upper and lower web rolls 177 and 178. The lower end of each column 210 movably supports one of the folding devices 175. A pair of webs 75s and 75t from the lower and upper web rolls are fed downwardly over a guide 217 and then to the folding device 175. The webs 75s and 75t are interfolded into the stack 76 in the manner described heretofore, and the stack is moved away to the left as seen in FIGURES 61, 62 and 68 by a conveyor belt 220 which extends along the full length of the front of the machine.

By comparing FIGURES 68 and 72, it is seen that each folding device 175 is supported to move upwardly as the web stack height increases. The folding device is mounted on a parallelogram mechanism indicated at 225 comprising the members 226, 227 and 228 which are pivoted together and are supported on pivots 230 and 231. These pivots are carried on a vertical arm 233 which is mounted on a cross arm 235 on the column 210.

As best shown in FIGURES 69 and 71, each folding device has a sprocket 238 on a shaft 239 which is actuated by a drive chain 240 extending the entire length of the front of the machine. The sprocket 238 turns another sprocket 242 on the shaft 239. This drives a chain 244 and a drive roll 246 on a shaft 248 on the parallelogram mechanism 225 to ride with the folding device 175 up and down on the top of the stack 76. The weight of this unit is partly counterbalanced by a spring 250. The arrangement is such that the folding device 175 may rise upwardly while remaining level as the height of the stack 76 is increased by additional interfolded webs. The drive roll 246 pressing downwardly on the web stack due to the weight of the unit cooperates with the conveyor belt 220 to move the stack to the left along its predetermined path.

The drive chain 240 may be inclined at the ends of the machine so as to disengage and reengage the sprockets 238 as the trolleys 187 leave and enter their operative positions. The chain 240 and the conveyor belt 220 are driven at the same or a proportionate speed by conventional variable speed drive means which are not shown. Since the drive roll 246 is driven by the relative movement of the corresponding trolley to the right and of the chain 240 and the belt 220 to the left, its surface speed will always be the same as the speed of the belt relative to the movement of the trolley even though such relative speed may be varied. The drive roll helps to draw the webs from the rolls 177 and 178 through the folding device and onto the belt.

As the web rolls 177 and 178 are exhausted during their movement to the right, as viewed FIGURES 61-64, the trolleys 187 are brought progressively closer together by the action of the cam track 207. The track 207 inclines upwardly along the front of the machine to raise the cam arms 203 and thereby move the trolleys 187 together. During the return of the empty roll supports 212 and 213 along the back of the machine, they are spread further apart by downward inclination of the track 207 to provide a delay time for reloading the roll supports with fresh web rolls at the reloading station at the lefthand end of the machine as seen in FIGURE 61.

The rate of progress of the roll supports 212 and 213 may be readily adjusted so that the rolls 177 and 178 thereon do not become exhausted until they reach the end of the stack. With this arrangement, the ends of the rolls appear only at the bottom of the stack, where they do no harm, and not in the middle of the stack. Therefore, the stack is not damaged and does not need to be pinked.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. In a machine for interfolding a plurality of webs, in combination, a source of webs to be folded, means for receiving webs from said source and for advancing the same in a stack of webs, and a plurality of folding devices disposed in spaced-apart relationship with each other for interfolding the webs into the stack by turning over their edge portions and placing them so that an edge portion of one web lies between the edge portions of another web, one of said folding devices including a folding element diagonally positioned with respect to the path of the stack for only partially turning a given edge portion over the stack and an adjacent folding device including means for completing the turning over of said given edge portion.

2. In a machine for interfolding a plurality of webs, in combination, a source of webs to be folded, conveyor means for receiving webs from said source and for advancing the same in a stack along a predetermined path, and a plurality of folding devices disposed in spaced-apart relationship with each other along the path of said stack, said folding devices being operable to interfold the webs into the stack by turning over their edge portions and placing them so that an edge portion of one web lies between the edge portions of another web, one of said folding devices including a folding element diagonally positioned with respect to the path of the stack for only partially turning a given edge portion over the stack and an adjacent folding device including means for completing the turning over of said given edge portion.

3. In a machine for interfolding a plurality of webs, in combination, a first folding device having a first folding element for receiving one of said webs and only partially turning a given edge portion thereof over the remaining edge portion, and a second folding device in spaced-apart relationship with said first folding device for receiving said one web therefrom, said second folding device having a second folding element for completing the turning over of said given edge portion, said first and second folding elements being angularly disposed with respect to the longitudinal dimension of said webs and being offset with respect to each other such that a substantial part of the turning over of said given edge portion takes place in the space between said first folding device and said second folding device.

4. In a machine for interfolding a plurality of webs, in combination, a source of webs to be folded, conveyor means for receiving webs from said source and for advancing the same in a stack of webs, and a plurality of folding devices disposed in spaced-apart relationship with each other for interfolding the webs into the stack by turning over their edge portions and placing them so that an edge portion of one web lies between the edge portions of another web, one of said folding devices including first folding means diagonally positioned with respect to the path of the stack for only partially turning a given edge portion over the stack and an adjacent folding device including second folding means for completing the turning over of said given edge portion, said first and second folding means being offset with respect to each other relative to the path of the stack such that a substantial part of the turning over of said given edge portion takes place in the space between said one folding device and said adjacent folding device.

5. In a machine for interfolding a plurality of webs, in combination, a source of webs to be folded, conveyor means for receiving webs from said source and for advancing the same in a stack along a predetermined path, and a plurality of folding devices longitudinally disposed in spaced-apart relationship with each other along the path of said stack, said folding devices being operable to interfold the webs into the stack by turning over their edge oprtions and placing them so that an edge portion of one web lies between the edge portions of another web, one of said folding devices including a first folding element diagonally positioned with respect to the path of the stack for only partially turning a given edge portion over the stack and an adjacent folding device including a second folding element for completing the turning over of said given edge portion, said first and second folding elements being offset with respect to each other relative to the path of the stack such that a substantial part of the turning over of said given edge portion takes place in the space between said one folding device and said adjacent folding device.

6. In a machine of the character set forth in claim 5, the space between said one folding device and said adjacent folding device being less than the longitudinal dimension of said one folding device along said path.

7. In a machine of the character set forth in claim 5, the space between said one folding device and said adjacent folding device being greater than the longitudinal dimension of said one folding device along said path.

8. In a machine for interfolding a plurality of webs, in combination, a source of webs to be folded, means for receiving webs from said source and for advancing the same in a stack along a predetermined path, and a plurality of folding devices disposed in spaced-apart relationship with each other along the path of said stack, said folding devices being operable to interfold the webs into the stack by turning over their edge portions and placing them so that an edge portion of one web lies between the edge portions of another web, a first of said folding devices having a first folding element diagonally positioned with respect to the path of the stack for only partially turning a given edge portion over the stack and a second of said folding devices having a second folding element for completing the turning over of said given edge portion, said first and second folding elements being offset with respect to each other relative to the path of the stack such that a substantial part of the turning over of said given edge portion takes place in the space between said first folding device and said second folding device.

9. In a machine for interfolding a plurality of webs, in combination, a source of webs to be folded, conveyor means for receiving webs from said source and for advancing the same in a stack of webs, and a plurality of folding devices disposed in spaced-apart relationship with each other for interfolding the webs into the stack by turning over their edge portions and placing them so that an edge portion of one web lies between the edge portions of another web, each of said folding devices having a first folding element diagonally positioned with respect to the path of the stack and a second element of a construction different from said first element, the first folding element of one of said folding devices only partially turning a given edge portion over the stack and the second folding element of an adjacent folding device completing the turning over of said given edge portion.

10. In a machine for interfolding a plurality of webs, in combination, a source of webs to be folded, conveyor means for receiving webs from said source and for advancing the same in a stack along a predetermined path, and a plurality of folding devices disposed in spaced-apart relationship with each other along the path of said stack, said folding devices being operable to interfold the webs into the stack by turning over their edge portions and placing them so that an edge portion of one web lies between the edge portions of another web, each of said folding devices having a first folding element and a second folding element of a construction different from said first element, the first folding element of one of said folding devices only partially turning a given edge portion over the stack and the second folding element of an adjacent folding device completing the turning over of said given edge portion, said first and second folding elements being angularly disposed with respect to the longitudinal dimension of said webs and being offset with respect to each other such that a substantial part of the turning over of said given edge portion takes place in the space between said one folding device and said adjacent folding device.

11. In a machine for interfolding a plurality of webs, in combination, a source of webs to be folded, conveyor means for receiving webs from said source and for advancing the same in a stack along a predetermined path, a first folding device including a first pair of folding elements extending in angularly opposite directions with respect to the path of said stack, one of the folding elements in said first pair forming a left-hand fold in a first of said webs as it is advanced along said path and the other folding element in said first pair partially forming a right-hand fold in a second of said webs which is to be interfolded with the first web, and a second folding device in spaced-apart relationship with said first folding device and including a second pair of folding elements extending in angularly opposite directions with respect to the path of said stack, one of the folding elements in said second pair completing the right-hand fold in the second of said webs which is to be interfolded with said first web as the webs are advanced along said path and the other folding element in said second pair forming a left-hand fold in a third of said webs as it is advanced along said path, said second folding device being substantially identical to said first folding device.

12. In a machine for interfolding a plurality of webs, in combination, a source of webs to be folded, means for receiving webs from said source and for advancing the same in a stack of webs, a first folding device disposed along the path of said stack and including a first pair of folding elements extending in diagonally opposite directions with respect to said path, one of the folding elements in said first pair forming a left-hand fold in a first of said webs as it is advanced in said stack and the other folding element in said first pair partially forming a right-hand fold in a second of said webs which is to be interfolded with the first web, and a second folding device disposed along the path of said stack immediately adjacent said first folding device and including a second pair of folding elements extending in diagonally opposite directions with respect to said path, one of the folding elements in said second pair completing the right-hand fold in the second of said webs which is to be interfolded with said first web as the webs are advanced along said path and the other folding element in said second pair forming a left-hand fold in a third of said webs as it is advanced along said path, said second folding device being substantially identical to said first folding device.

13. In a machine for interfolding a plurality of webs, in combination, a source of webs to be folded, conveyor means for receiving webs from said source and for advancing the same in a stack of webs, a first folding device disposed along the path of said stack and including a first pair of folding edges extending in angularly opposite directions with respect to the path of said stack, one of the folding edges in said first pair forming a left-hand fold in a first of said webs as it is advanced along said path and the other folding edge in said first pair partially forming a right-hand fold in a second of said webs which is to be interfolded with the first web, and a second folding device disposed along said path in spaced-apart relationship with said first folding device and including a second pair of folding edges extending in angularly opposite directions with respect to the path of said stack, one of the folding edges in said second pair completing the right-hand fold in the second of said webs which is to be interfolded with said first web as the webs are advanced along said path and the other folding edge on said second pair forming a left-hand fold in a third of said webs as it is advanced along said path, said second folding device being substantially identical to said first folding device.

14. In a machine of the character set forth in claim 13, each of said folding devices comprising substantially horizontal plate means including a folding element forming one of said folding edges and a pair of horizontally spaced-apart members supported by the upper portion of said plate means and defining a web-receiving slot therebetween, one of said members forming the other of said folding edges.

15. In a machine of the character set forth in claim 13, each of said folding devices comprising plate means including a folding element forming one of said folding edges and an angularly disposed rod supported by said plate means.

16. In a machine of the character set forth in claim 15, a plurality of loop members mounted on each of said folding devices adjacent the angularly disposed rod therefor and extending in a lateral direction with respect to the path of said stack, said second web being guided by the loop members on said first folding device around the corresponding rod to at least partially form a fold in said second web.

17. In a machine of the character set forth in claim 15, the angularly disposed rod for said first folding device extending across the space between said first folding device and said second folding device to a position adjacent the latter device.

18. In a machine of the character set forth in claim 17, the portion of the rod for said first folding device which is disposed adjacent said second folding device being manually movable relative to the remaining portion of the rod to retract the first-mentioned portion toward said first device.

19. In a machine for interfolding a plurality of webs, in combination, a source of webs to be folded, means for directing successive pairs of webs from said source and for advancing each pair in contact with each other in substantially unfolded condition, means for receiving the webs from said source and advancing the same in a stack of webs with the webs in each pair in contact with each other at the time they reach said stack, and a plurality of folding devices disposed in spaced-apart relationship with each other along the path of said stack for interfolding the pairs of webs into the stack by turning over their edge portions and placing them so that an edge portion of a given web lies between the edge portions of another web, each of said pairs of webs being led to a separate one of said folding devices in said substantially unfolded condition, each said folding device only partially turning over an edge portion of one of the webs received thereby and completely turning over an edge portion of the other web received thereby.

20. In a machine for interfolding a plurality of webs, in combination, a source of webs to be folded, means for directing successive pairs of webs from said source and for advancing each pair in contact with each other in substantially unfolded condition, conveyor means for receiving the webs from said source and advancing the same in a stack along a predetermined path with the webs in each pair in contact with each other at the time they reach said stack, and a plurality of folding devices disposed in spaced-apart relationship with each other along the path of said stack for interfolding the pairs of webs into the stack by turning over their edge portions and placing them so that an edge portion of a given web lies between the edge portions of another web, each of said pairs of webs being led to a separate one of said folding devices with the webs in contact with each other in substantially unfolded condition, each said folding device only partially turning over an edge portion of one of the webs received thereby and simultaneously completely turning over an edge portion of the other web received thereby.

21. In a machine for interfolding a plurality of webs, in combination, a source of webs to be folded, means for directing successive pairs of webs from said source and for advancing each pair in contact with each other in substantially unfolded condition, means for receiving the webs from said source and advancing the same in a stack along a predetermined path with the webs in each pair in contact with each other at the time they reach said stack, and a plurality of folding devices disposed in spaced-apart relationship with each other along the path of said stack, said folding devices being operable to interfold the webs into the stack by turning over their edge portions and placing them so that an edge portion of a given web lies between the edge portions of another web, each of said pairs of webs being led to a separate one of said folding devices with the webs in contact with each other in substantially unfolded condition, each said folding device including first means for only partially turning over an edge portion of one of the webs thereby and second means for completely turning over an edge portion of the other web received thereby, the turning over of the edge portion of said one web being completed by a succeeding folding device disposed along said path.

22. In a machine of the character set forth in claim 21, said succeeding folding device including a folding finger defining an elongated slot extending at an angle with respect to the path of said stack, said one web being received by said slot to complete the turning over of the said edge portion of said one web.

23. In a machine for interfolding a plurality of webs, in combination, a source of webs to be folded, means for directing successive pairs of webs from said source and for advancing each pair in contact with each other in substantially unfolded condition, conveyor means for receiving the webs from said source and advancing the same in a stack along a predetermined path with the webs in each pair in contact with each other at the time they reach said stack, and a plurality of folding devices disposed in spaced-apart relationship with each other along the path of said stack for interfolding the pairs of webs into the stack by turning over their edge portions and placing them so that an edge portion of a given web lies between the edge portions of another web, each of said pairs of webs being led to a separate one of said folding devices with the webs in contact with each other in substantially unfolded condition, each said folding device only partially turning over an edge portion of one of the webs received thereby and simultaneously completely turning over an edge portion of the other web received thereby, the turning over of the edge portion of said one web being continued in the space between the corresponding folding device and the immediately succeeding folding device disposed along said path and being completed by said immediately succeeding device.

24. In a machine for interfolding a plurality of webs, in combination, a source of webs to be folded, means for directing successive pairs of webs from said source and for advancing each pair in contact with each other in substantially unfolded condition, conveyor means for receiving the webs from said source and advancing the same in a stack along a predetermined path with the webs in each pair in contact with each other at the time they reach said stack, and a plurality of folding devices disposed in spaced-apart relationship with each other along the path of said stack, said folding devices being operable to interfold the webs into the stack by turning over their edge portions and placing them so that an edge portion of a given web lies between the edge portion of another web, each of said pairs of webs being led to a separate one of said folding devices with the webs in contact with each other in substantially unfolded condition, each of said folding devices including first means for only partially turning over an edge portion of one of the webs received thereby, second means for completely turning over an edge portion of the other web received thereby and third means for completing the turning over of a partially turned over edge portion of a web from the immediately preceding folding device.

25. In a machine of the character set forth in claim 24, the first, second and third means on each of said folding devices respectively comprising three folding edges which each extend at an angle with respect to the path of said stack, the said edge portion of said one web being partially turned over a first of said folding edges, said edge portion of said other web being turned over a second of said folding edges, and said edge portion of the web from said preceding folding device being turned over a third of said folded edges.

26. In a machine of the character set forth in claim 25, the first means on each of said folding devices comprising plate means including a pair of spaced-apart plate portions, the second means on each of said folding devices comprising an angularly disposed rod supported by said plate means and the third means on each of said folding devices comprising a folding member positioned between said plate portions, one of said plate portions forming said first folding edge, said angularly disposed rod forming said second folding edge, and said folding member forming said third folding edge.

27. In a machine of the character set forth in claim 26, said one plate portion having a curved surface thereon in position to engage the web being turned over said first folding edge.

28. In a machine for interfolding a plurality of webs, in combination, a source of webs to be folded, means for directing successive pairs of webs from said source and for advancing each pair in contact with each other in substantially unfolded condition, conveyor means for receiving the webs from said source and advancing the same in a stack along a predetermined path with the webs in each pair in contact with each other at the time they reach said stack, and a plurality of folding devices disposed in spaced-apart relationship with each other along the path of said stack for interfolding the pairs of webs into the stack by turning over their edge portions and placing them so that an edge portion of a given web lies between the edge portions of another web, each of said pairs of webs being led to a separate one of said folding devices with the webs in contact with each other in substantially unfolded condition, each of said folding devices including first means for only partially turning over an edge portion of one of the webs received thereby, second means for completely turning over an edge portion of the other web received thereby and third means for completing the turning over of a partially turned over edge portion of a web from the immediately preceding folding device, a substantial part of the turning over of the edge portion of said one web taking place in the space between the corresponding folding device and the immediately succeeding folding device disposed along said path, the turning over of said edge portion of said one web being completed by said immediately succeeding device.

29. In a method for interfolding a plurality of webs in stacked relation as the webs move along a feed path, the steps of feeding a first pair of webs in contact with each other in substantially unfolded condition to a first folding location along said feed path, only partially turning over an edge portion of one of the webs in said first pair at said first folding location while maintaining the webs in said first pair in contact with each other, completely turning over an edge portion of the other web in said first pair at said first folding location, feeding a second pair of webs in contact with each other in substantially unfolded condition to a second folding location spaced from said first location along said feed path, only partially turning over an edge portion of one of the webs in said second pair at said second folding location while maintaining the webs in said second pair in contact with each other, and completely turning over an edge portion of the other web in said second pair at said second folding location and inserting the same beneath the said edge portion of said one web in said first pair.

30. In a method for interfolding a plurality of webs in stacked relation as the webs move along a feed path, the steps of feeding a first pair of webs in contact with each other in substantially unfolded condition to a first folding location along said feed path, only partially turning over an edge portion of one of the webs in said first pair at said first folding location while maintaining the webs in said first pair in contact wtih each other, completely turning over an edge portion of the other web in said first pair at said first folding location, continuing the turning over of the edge portion of said one web in said first pair as the web moves along said path from said first folding location to a second folding location in spaced relationship therewith, feeding a second pair of webs in contact with each other in substantially unfolded condition to said second folding location, only partially turning over an edge portion of one of the webs in said second pair at said second folding location while maintaining the webs said second pair in contact with each other, and completely turning over an edge portion of the other web in said second pair at said second folding location and inserting the same beneath the said edge portion of said one web in said first pair.

31. In a method for interfolding a plurality of webs in stacked relation as the webs move along a feed path, the steps of feeding a first pair of webs in contact with each other in substantially unfolded condition to a first folding location along said feed path, partially turning over an edge portion of one of the webs in said first pair at said first folding location while maintaining the webs in said first pair in contact with each other, simultaneously completely turning over an edge portion of the other web in said first pair at said first folding location, continuing the turning over of the edge portion of said one web in said first pair as the web moves along said path from said first folding location to a second folding location in spaced relationship therewith, feeding a second pair of webs in contact with each other in substantially unfolded condition to said second folded location, partially turning over an edge portion of one of the webs in said second pair at said second folding location while maintaining the webs in said second pair in contact with each other, and simultaneously completely turning over an edge portion of the other web in said second pair at said second folding location and inserting the same beneath the said edge portion of said one web in said first pair.

32. In a method for interfolding a plurality of webs of stacked relation as the webs move along a feed path, the steps of feeding a first pair of webs in contact with each other in substantially unfolded condition to a first folding location along said feed path, partially turning over an edge portion of one of the webs in said first pair at said first folding location while maintaining the webs in said first pair in contact with each other, completely turning over an edge portion of the other web in said first pair at said first folding location, continuing the turning over of the edge portion of said one web in said first pair as the web moves along said path from said first folding location to a second folding location in spaced relationship therewith, feeding a second pair of webs in contact with each other in substantially unfolded condition to said second folding location, partially turning over an edge portion of one of the webs in said second pair at said second folding location while maintaining the webs in said second pair in contact with each other, completely turning over an edge portion of the other web in said second pair at said second folding location and inserting the same beneath the said edge portion of said one web in said first pair, and completing the turning over of said edge portion of said one web in said first pair at said second folding location.

33. In a method for interfolding a plurality of webs in stacked relation as the webs move along a feed path, the steps of feeding a first pair of webs in contact with each other in substantially unfolded condition to a first folding location along said feed path, partially turning over an edge portion of one of the webs in said first pair at said first folding location while maintaining the webs in said first pair in contact with each other, simultaneously completely turning over an edge portion of the other web in said first pair at said first folding location, continuing the turning over of the edge portion of said one web in said first pair as the web moves along said path from said first folding location to a second folding location in spaced relationship therewith, feeding a second pair of webs in contact with each other in substantially unfolded condition to said second folding location, partially turning over an edge portion of one of the webs in said second pair at said second folding location while maintaining the webs in said second pair in contact with each other, simultaneously completely turning over an edge portion of the other web in said second pair at said second folding location and inserting the same beneath the said edge portion of said one web in said first pair, and completing the turning over of said edge portion of said one web in said first pair at said second folding location subsequent to the initiation of the turning over of the said edge portion of said other web in said second pair.

References Cited

UNITED STATES PATENTS

| | | | |
|---|---|---|---|
| 2,642,279 | 6/1953 | Teall | 270—40 |
| 3,199,861 | 10/1965 | Presnell et al. | 270—40 |
| 3,291,479 | 12/1966 | Greiner et al. | 270—40 |
| 3,330,553 | 7/1967 | Coozens et al. | 270—40 |

EUGENE R. CAPOZIO, Primary Examiner

P. V. WILLIAMS, Assistant Examiner